US012560829B2

(12) United States Patent
Lu et al.

(10) Patent No.: US 12,560,829 B2
(45) Date of Patent: Feb. 24, 2026

(54) PHOTONIC SEMICONDUCTOR DEVICE AND METHOD

(71) Applicant: Taiwan Semiconductor Manufacturing Co., Ltd., Hsinchu (TW)

(72) Inventors: Chih-Hsin Lu, Tainan (TW); Chin-Her Chien, Chung-Li (TW); Chung-Hao Tsai, Huatan Township (TW); Chuei-Tang Wang, Taichung (TW); Chen-Hua Yu, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 348 days.

(21) Appl. No.: 18/151,015

(22) Filed: Jan. 6, 2023

(65) Prior Publication Data

US 2024/0142732 A1      May 2, 2024

Related U.S. Application Data

(60) Provisional application No. 63/382,026, filed on Nov. 2, 2022.

(51) Int. Cl.
*G02F 1/01* (2006.01)
*G02B 6/132* (2006.01)
*G02B 6/12* (2006.01)

(52) U.S. Cl.
CPC .............. *G02F 1/011* (2013.01); *G02B 6/132* (2013.01); *G02B 2006/12142* (2013.01); *G02F 2202/36* (2013.01)

(58) Field of Classification Search
CPC ......... G02B 2006/12142; G02F 1/0155–0159; G02F 2202/00
USPC ......................................... 385/1–3
See application file for complete search history.

(56) References Cited

U.S. PATENT DOCUMENTS

| | | | | |
|---|---|---|---|---|
| 11,067,836 B2 * | 7/2021 | Joo | ....................... | G02F 1/0121 |
| 12,166,031 B2 * | 12/2024 | Guha | ................... | H10D 8/422 |
| 2016/0380121 A1 * | 12/2016 | Suzuki | ................. | H10F 77/122 257/29 |

(Continued)

FOREIGN PATENT DOCUMENTS

| | | | | |
|---|---|---|---|---|
| CN | 103901638 | * | 7/2014 | ............. G02F 1/035 |
| CN | 107894669 A | | 4/2018 | |

(Continued)

OTHER PUBLICATIONS

"Silicon-Based Graphene Electro-Optical Modulators" by Jin et al., Photonics, vol. 9, paper 82 (Year: 2022).*

(Continued)

*Primary Examiner* — Robert Tavlykaev
(74) *Attorney, Agent, or Firm* — Slater Matsil, LLP

(57) ABSTRACT

A method includes forming a first waveguide over a substrate; forming a first layer of low-dimensional material on the first waveguide; forming a first layer of dielectric material over the first layer of low-dimensional material; forming a second layer of low dimensional material on the first layer of dielectric material; and forming a first conductive contact that electrically contacts the first layer of low-dimensional material and a second conductive contact that electrically contacts the second layer of low-dimensional material.

21 Claims, 34 Drawing Sheets

(56)　　　　　　　References Cited

U.S. PATENT DOCUMENTS

| | | | | |
|---|---|---|---|---|
| 2023/0117534 | A1* | 4/2023 | Schall | G02F 1/2257 |
| | | | | 385/3 |
| 2023/0296956 | A1* | 9/2023 | Datta | G02F 1/035 |
| | | | | 385/3 |
| 2024/0194806 | A1* | 6/2024 | Badcock | H10F 77/413 |
| 2024/0385471 | A1* | 11/2024 | Romagnoli | G02F 1/0316 |
| 2025/0270705 | A1* | 8/2025 | Dixon | G02F 1/0009 |

FOREIGN PATENT DOCUMENTS

| | | | | |
|---|---|---|---|---|
| CN | 108121091 | A | 6/2018 | |
| CN | 11047000 | A * | 8/2019 | G02F 1/03 |

OTHER PUBLICATIONS

Vito Sorianello et al., "Graphene on Silicon Modulators," Journal of Lightwave Technology, vol. 38, No. 10, May 15, 2020, pp. 2782-2789.

* cited by examiner

PHOTONIC SEMICONDUCTOR DEVICE AND METHOD

PRIORITY CLAIM AND CROSS-REFERENCE

This application claims the benefit of U.S. Provisional Application No. 63/382,026, filed on Nov. 2, 2022, entitled "Photonic Semiconductor Device and Method," which application is incorporated herein by reference.

BACKGROUND

Electrical signaling and processing are one technique for signal transmission and processing. Optical signaling and processing have been used in increasingly more applications in recent years, particularly due to the use of optical fiber-related applications for signal transmission. Optical signaling and processing are typically combined with electrical signaling and processing to provide full-fledged applications. For example, waveguides may be used for optical signal transmission. Optical signals within a waveguide may be controlled by an optical modulator, such as an optical phase shifter or the like.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 13A and 13B schematically illustrate a plan view and a cross-sectional view of an electro-optic modulator comprising a low-dimensional material, in accordance with some embodiments.

FIGS. 14A and 14B schematically illustrate a plan view and a cross-sectional view of an electro-optic modulator comprising a low-dimensional material, in accordance with some embodiments.

DETAILED DESCRIPTION

Figure 1:
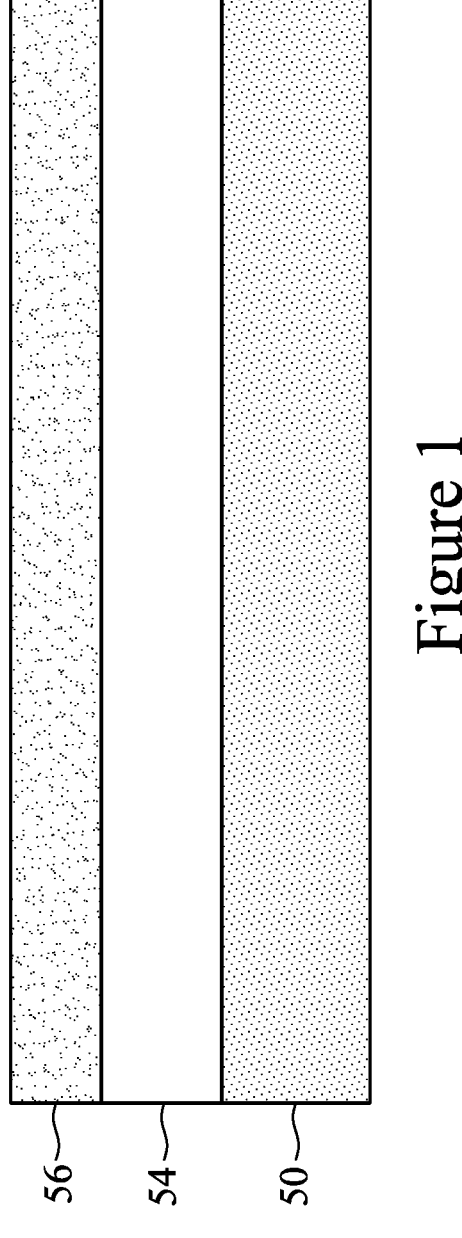
FIGS. 1, 2, 3, 4, 5, 6, 7, 8, 9, 10, and 11 illustrate cross-sectional views of intermediate steps in the formation of a photonic device comprising a low-dimensional material, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, photonic devices and photonic structures are formed that utilize one or more layers of low-dimensional material. The low-dimensional material may be, for example, a 2D material, a monolayer, a small number of monolayers, or the like. In some embodiments, layers of low-dimensional material are formed adjacent a waveguide in order to allow control of optical signals within the waveguide. For example, voltages may be supplied to the layers of low-dimensional material to increase or decrease the optical absorption of the low-dimensional material. In this manner, the low-dimensional material may facilitate modulation of optical signals within the waveguide. Other devices or structures, such as photodetectors, interferometers, multi-waveguide structures, or the like are contemplated. The use of low-dimensional materials in photonic devices or photonic structures as described herein can allow for reduced size, reduced manufacturing cost, or improved efficiency.

FIGS. 1 through 11 illustrate cross-sectional views of intermediate steps in the formation of a photonic device comprising low-dimensional materials 64A-B (see FIG. 11), in accordance with some embodiments. In FIG. 1, a substrate 50 is provided, in accordance with some embodiments. The substrate 50 may be a semiconductor substrate, such as a bulk semiconductor, a semiconductor-on-insulator (SOI) substrate, or the like, which may be doped (e.g., with a p-type or an n-type dopant) or undoped. The substrate 50 may be a wafer, such as a silicon wafer. Generally, an SOI substrate is a layer of a semiconductor material formed on an insulator layer. The insulator layer may be, for example, a buried oxide (BOX) layer, a silicon oxide layer, or the like. The insulator layer is provided on a substrate, typically a silicon or glass substrate. Other substrates, such as a multi-layered or gradient substrate may also be used. In some embodiments, the semiconductor material of the substrate 50 may include silicon; germanium; a compound semiconductor including silicon carbide, gallium arsenide, gallium phosphide, indium phosphide, indium arsenide, and/or indium antimonide; an alloy semiconductor including silicon-germanium, gallium arsenide phosphide, aluminum indium arsenide, aluminum gallium arsenide, gallium indium arsenide, gallium indium phosphide, and/or gallium indium arsenide phosphide; or combinations thereof.

An insulation material 54 is formed over the substrate 50, in accordance with some embodiments. The insulation material 54 may be an oxide, such as silicon oxide, a nitride, the like, or a combination thereof, and may be formed using a suitable technique such as plasma-enhanced chemical vapor deposition (PECVD), high density plasma chemical vapor deposition (HDP-CVD), a flowable CVD (FCVD) (e.g., a CVD-based material deposition in a remote plasma system and post curing to make it convert to another material, such as an oxide), the like, or a combination thereof. Other insulation materials formed by any acceptable process may be used. In some embodiments, the insulation material 54 may be a BOX layer of the substrate 50. Although the insulation material 54 is illustrated as a single layer, some embodiments may utilize multiple layers. In some embodiments, the insulation material 54 may be planarized using a planarization process such as a chemical mechanical polish (CMP), a grinding process, an etch-back process, combinations thereof, or the like. In some embodiments, the insulation material 54 has a thickness in the range of about 2 μm to about 3 μm, though other thicknesses are possible.

A silicon nitride layer 56 is deposited on the insulation material 54, in accordance with some embodiments. The silicon nitride layer 56 may be formed using a suitable deposition technique, such as chemical vapor deposition (CVD), PECVD, low pressure chemical vapor deposition (LPCVD), physical vapor deposition (PVD), or the like. In some embodiments, the silicon nitride layer 56 has a thickness in the range of about 0.3 μm to about 0.8 μm, though other thicknesses are possible.

Figure 2:
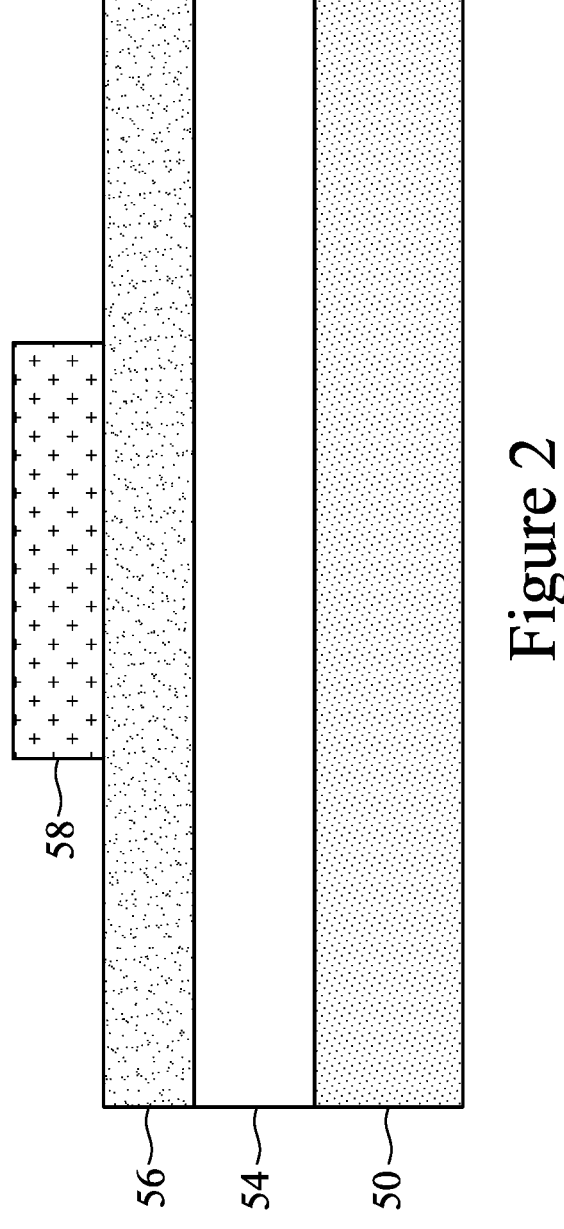
Figure 3:
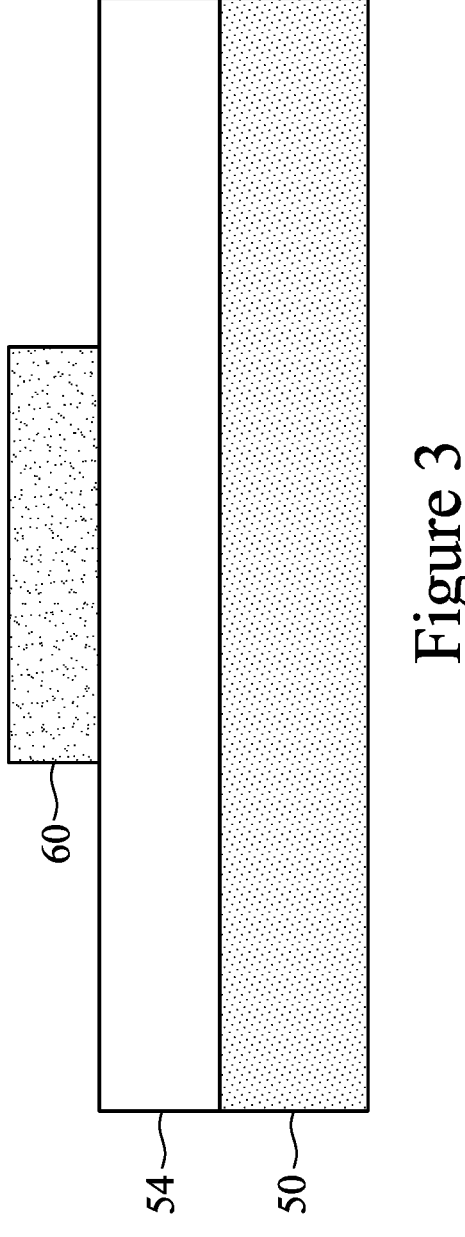

FIGS. 2 and 3 illustrate the patterning of the silicon nitride layer 56 to form one or more waveguides 60 (see FIG. 3), in accordance with some embodiments. The silicon nitride layer 56 may be patterned using acceptable photolithography and etching techniques. For example, as shown in FIG. 2, an etching mask 58 may be formed over the silicon nitride layer 56 and patterned, in some embodiments. The etching mask 58 may be formed, for example, by depositing one or more layers over the insulation material 54 and then patterning the layers using suitable photolithographic techniques. For example, in some embodiments, the layer(s) may be patterned using an electron-beam lithography (EBL) technique or the like. The etching mask 58 can be formed of a photoresist, such as a single layer photoresist, a bi-layer photoresist, a tri-layer photoresist, or the like. In some embodiments, etching mask 58 is a tri-layer mask comprising a bottom layer (e.g., a bottom anti-reflective coating (BARC) layer), a middle layer (e.g., a nitride, an oxide, an oxynitride, or the like), and a top layer (e.g., a photoresist). The etching mask 58 may be formed by spin coating, a deposition process such as CVD, combinations thereof, or the like. Other materials or techniques are possible.

Turning to FIG. 3, the pattern of the etching mask 58 may then be transferred to the silicon nitride layer 56 using an etching process. The etching process may include, for example, a dry etching process and/or a wet etching process. The etching process may be any acceptable etch process, such as a reactive ion etch (RIE), a neutral beam etch (NBE), the like, or a combination thereof. The etching process may be anisotropic. In some embodiments, the etching process may be selective to silicon nitride over the insulation material 54. In this manner, the silicon nitride layer 56 may be etched to form recesses defining the waveguides 60, with sidewalls of the remaining unrecessed portions defining sidewalls of the waveguides 60. In some embodiments, more than one photolithography and etching sequence may be used in order to pattern the silicon nitride layer 56. The etching mask 58 may be removed, for example, using a suitable etching process or ashing process. In some embodiments, the waveguides 60 may be formed having a width in the range of about 800 nm to about 2000 nm, though other widths are possible.

Figure 15B:
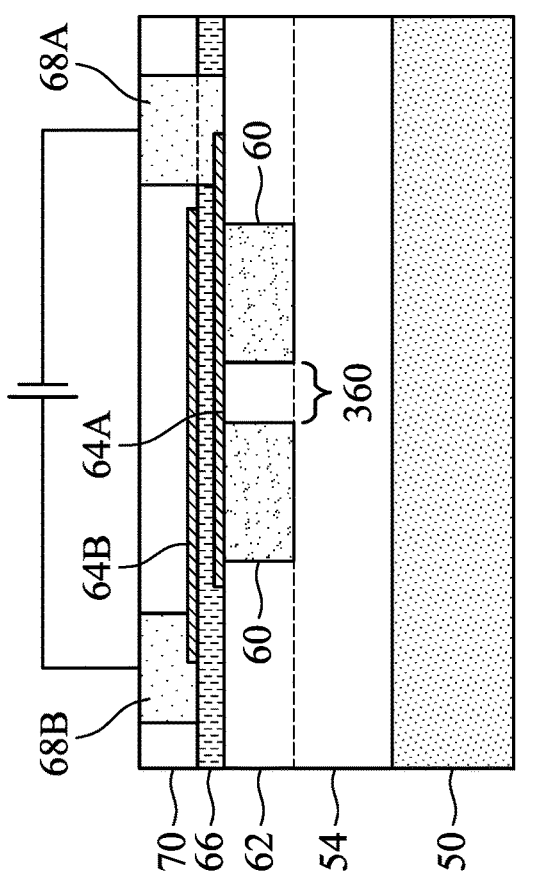
FIGS. 15A and 15B schematically illustrate a plan view and a cross-sectional view of an electro-optic modulator for a slot waveguide comprising a low-dimensional material, in accordance with some embodiments.
Figure 15A:
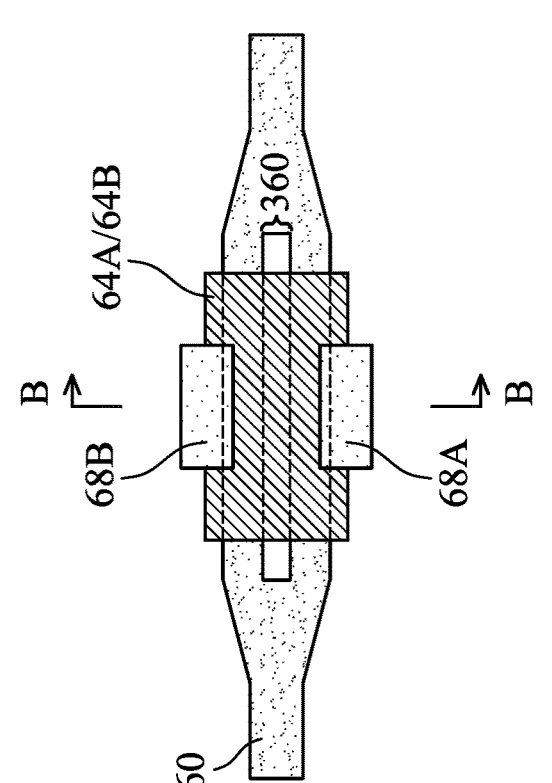

One waveguide 60 or multiple waveguides 60 may be patterned from the silicon nitride layer 56. If multiple waveguides 60 are formed, the multiple waveguides 60 may be individual separate waveguides 60 or connected as a single continuous structure. In some embodiments, one or more of the waveguides 60 form a continuous loop. In other embodiments, the silicon nitride layer 56 may be patterned to form "slot" waveguides, an example of which is illustrated in FIGS. 15A-15B. In some embodiments, the waveguides 60 may include photonic structures such as grating couplers, edge couplers, ring couplers, multi-mode interferometers (MMIs), mode converters, or the like. In other embodiments, a material other than silicon nitride may be used.

Figure 4:
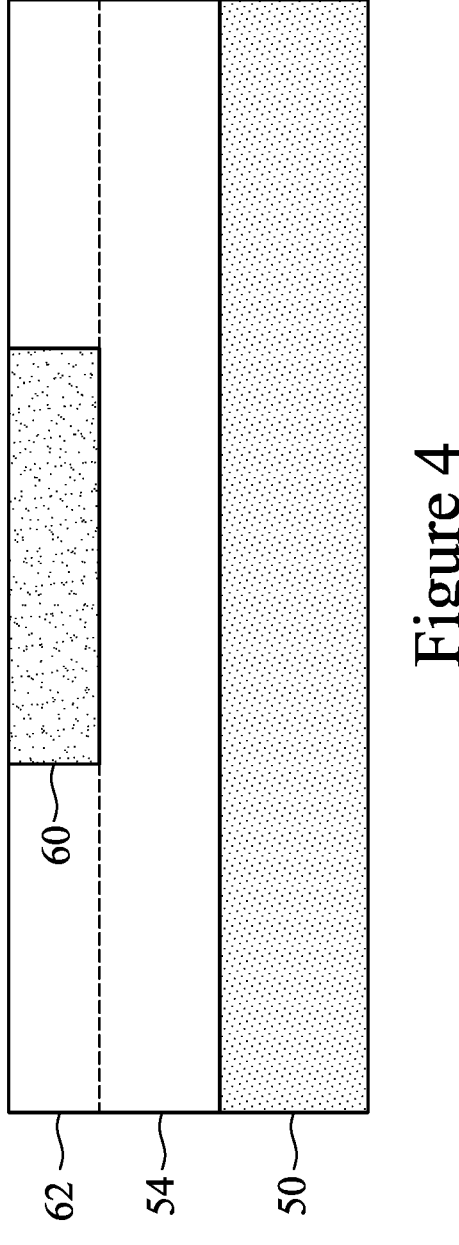

In FIG. 4, an insulation material 62 is deposited over the insulation material 54 and the waveguides 60, in accordance with some embodiments. The insulation material 62 may be similar to a material described previously for the insulation 54, and may be formed using similar techniques. For example, in some embodiments, the insulation material 62 may be silicon oxide deposited using PECVD, though other materials or deposition techniques are possible. The insulation material 62 may be the same material as the underlying insulation material 54 or may be a different material than the underlying insulation material 54. In some embodiments, a planarization process (e.g., a CMP process) may be performed after depositing the insulation material 62. In some embodiments, after performing a planarization process, top surfaces of the insulation material 62 and the waveguides 60 are coplanar or level (e.g., within process variations).

Figure 5:
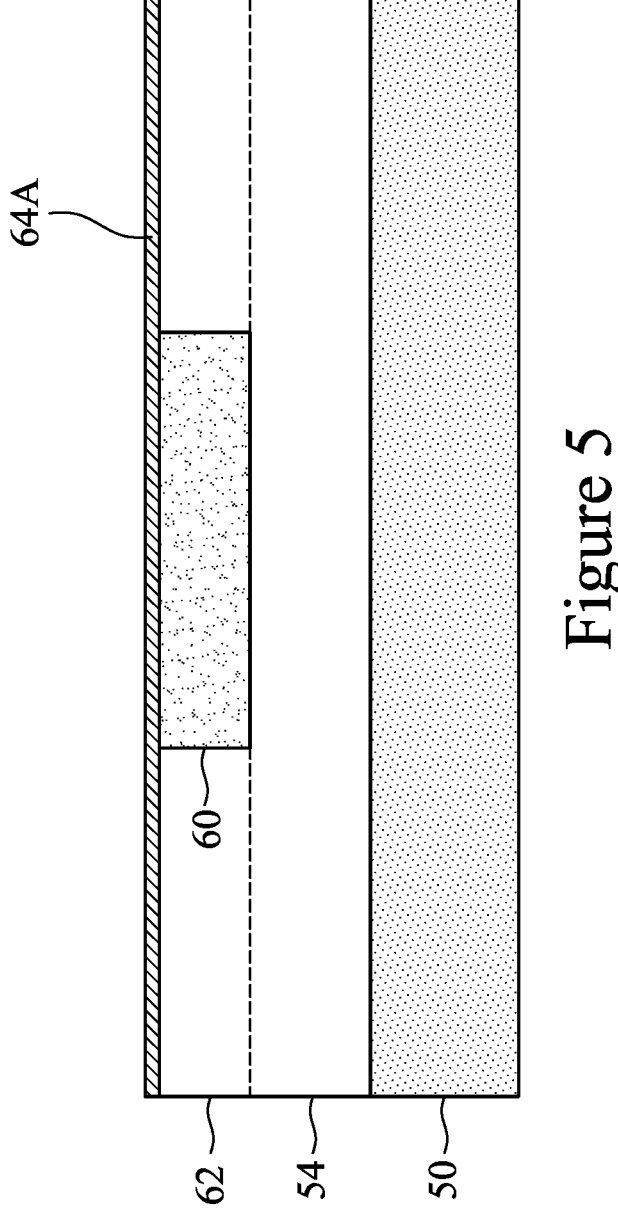

In FIG. 5, a layer of low-dimensional material 64A is formed over the waveguides 60, in accordance with some embodiments. The low-dimensional material 64A may also be formed over the insulation material 62, in some embodiments. Throughout the description, the term "low-dimensional" refers to a layer having a small thickness, such as a thickness less than about 10 nm. The low-dimensional material 64A may have another thickness in other cases, such as a thickness less than about 5 nm or less than about 1 nm. Other thicknesses are possible. In some embodiments, the low-dimensional material 64A may be a single monolayer or a small number of monolayers (e.g., 2, 3, 5, etc.).

The low-dimensional material 64A may be a material suitable for optical interaction with the waveguides 60. For example, the low-dimensional material 64A may be a material having controllable optical properties, such as controllable absorption characteristics, a controllable refractive index, or the like. The optical properties may be controlled, for example, by applying a voltage, an electric field, a current, or the like to the low-dimensional material 64A. In some embodiments, the optical properties of the low-dimensional material 64A may be controlled by heating the low-dimensional material 64A (e.g., by flowing a current). Controlling the optical properties of the low-dimensional material 64A in this manner can affect the optical properties of an adjacent waveguide 60, which can allow for control of optical signals within the waveguide 60. In this manner, the low-dimensional material 64A may be used to form photonic devices such as phase shifters, optical modulators, or the like. In other embodiments, a current may be flowed through the low-dimensional material 64A to generate heat that affects the optical properties of an adjacent waveguide 60. In other embodiments, the low-dimensional material 64A may be used to achieve passive optical effects, or may be used as part of a photonic device such as a photodetector.

In some embodiments, the low-dimensional material 64A may comprise a graphene monolayer, multiple monolayers of graphene, nanoribbons of graphene, a layer of carbon nanotubes (e.g., aligned, networks, etc.), a layer of a transition metal dichalcogenide (TMD) material, a layer of phosphorus (e.g., black phosphorus), hexagonal boron nitride (e.g., hBN), multilayers thereof, combinations thereof, or the like. In embodiments in which the low-dimensional material 64A comprises discrete elements, the low-dimensional material 64A can further include a material that fills the space between the discrete elements. The low-dimensional material 64A may be formed using any suitable techniques. The low-dimensional material 64A may be deposited directly on the waveguides 60 or may be deposited on an intermediate substrate (not pictured) and transferred onto the waveguides 60. The low-dimensional material 64A may be deposited using suitable deposition processes, such as PECVD, CVD, ALD, or the like. If an intermediate substrate is used, the low-dimensional material 64A may be transferred from the intermediate substrate using a suitable process, such as a wet transfer process or a dry transfer process.

Figure 6:
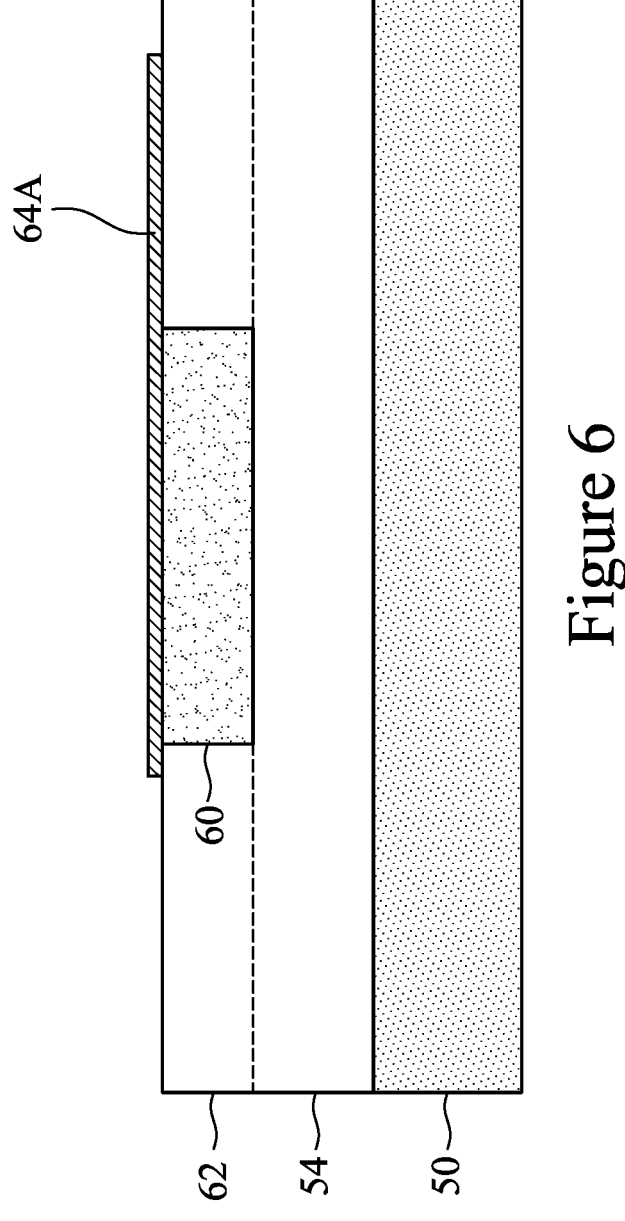

In FIG. 6, the low-dimensional material 64A is patterned, in accordance with some embodiments. The low-dimensional material 64A may be patterned using acceptable photolithography and etching techniques. For example, in some embodiments, an etching mask (not shown) is formed over the low-dimensional material 64A. The etching mask may be patterned using suitable photolithographic techniques. For example, the etching mask may be patterned using EBL or the like. The low-dimensional material 64A is then etched using the etching mask. The etching may be performed using any acceptable etching process, such as RIE, NBE, a dry etching process, a wet etching process, the like, or a combination thereof. The etching process may be anisotropic. In some embodiments, the etching process is selective to the low-dimensional material 64A and stops or slows on the insulation material 62. Accordingly, the etching process may expose top surfaces of the insulation material 62. In some cases, top surfaces of the waveguides 60 may also be exposed.

Figure 7:
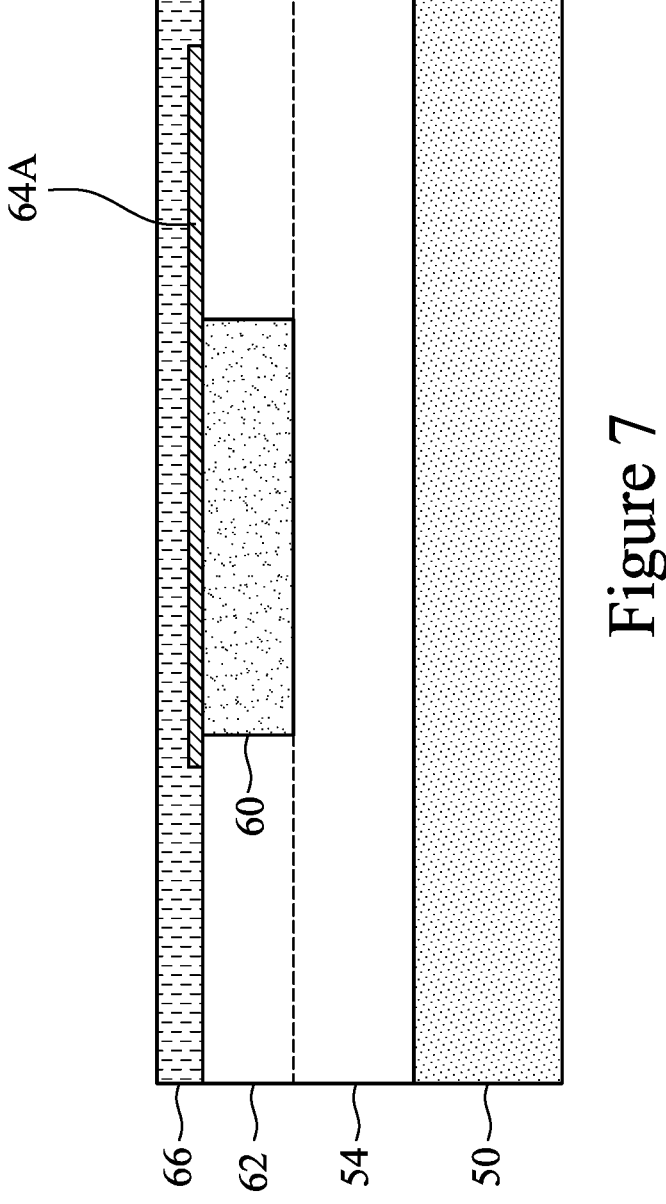

In FIG. 7, a dielectric layer 66 is formed over the low-dimensional material 64A, in accordance with some embodiments. The dielectric layer 66 may be a blanket layer, and may also be formed on the insulation material 62 and/or the waveguides 60, in some embodiments. The dielectric layer 66 may comprise one or more layers comprising one or more materials such as aluminum oxide, silicon oxide, hBN, the like, or combinations thereof. The dielectric layer 66 may be formed using a suitable deposition technique, such as ALD, CVD, PVD, spin-on, or the like. In some embodiments, a planarization process, such as a CMP process, may be performed after depositing the dielectric layer 66. In some embodiments, the dielectric layer 66 may have a thickness in the range of about 10 nm to about 50 nm, though other thicknesses are possible.

Figure 8:
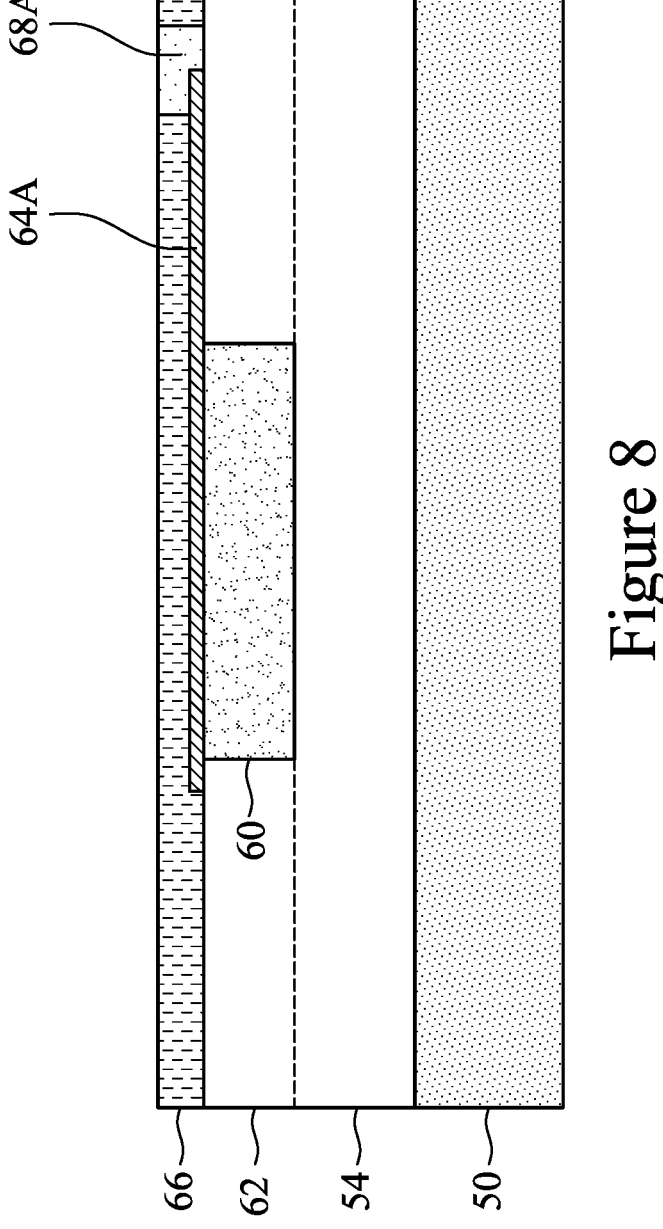

In FIG. 8, a conductive contact 68A to the low-dimensional material 64A is formed, in accordance with some embodiments. The conductive contact 68A is physically and electrically coupled to the low-dimensional material 64A such that a current, voltage, or the like may be provided to the low-dimensional material 64A. In some embodiments, the conductive contact 68A may include multiple layers of conductive material formed using multiple process steps, such as the conductive contact 68A illustrated in FIG. 11. In some embodiments, the conductive contact 68A may be formed by forming one or more openings through the dielectric layer 66 that expose the low-dimensional material 64A. The openings may be formed using acceptable photolithography and etching techniques, such as EBL or the like. In some embodiments, an optional liner (not shown), such as a diffusion barrier layer, an adhesion layer, or the like, and a conductive material are formed in the openings. The liner may include titanium, titanium nitride, tantalum, tantalum nitride, or the like. The conductive material may be copper, a copper alloy, silver, gold, tungsten, cobalt, aluminum, nickel, ruthenium, or the like. The conductive material may be deposited using a suitable technique, such as electron-beam evaporation, ALD, PVD CVD, plating, or the like. In some embodiments, a planarization process (e.g., a CMP process) may be performed to remove excess material of the conductive contact 68A. In some embodiments, after performing the planarization process, top surfaces of the dielectric layer 66 and the conductive contact 68A may be level.

Figure 9:
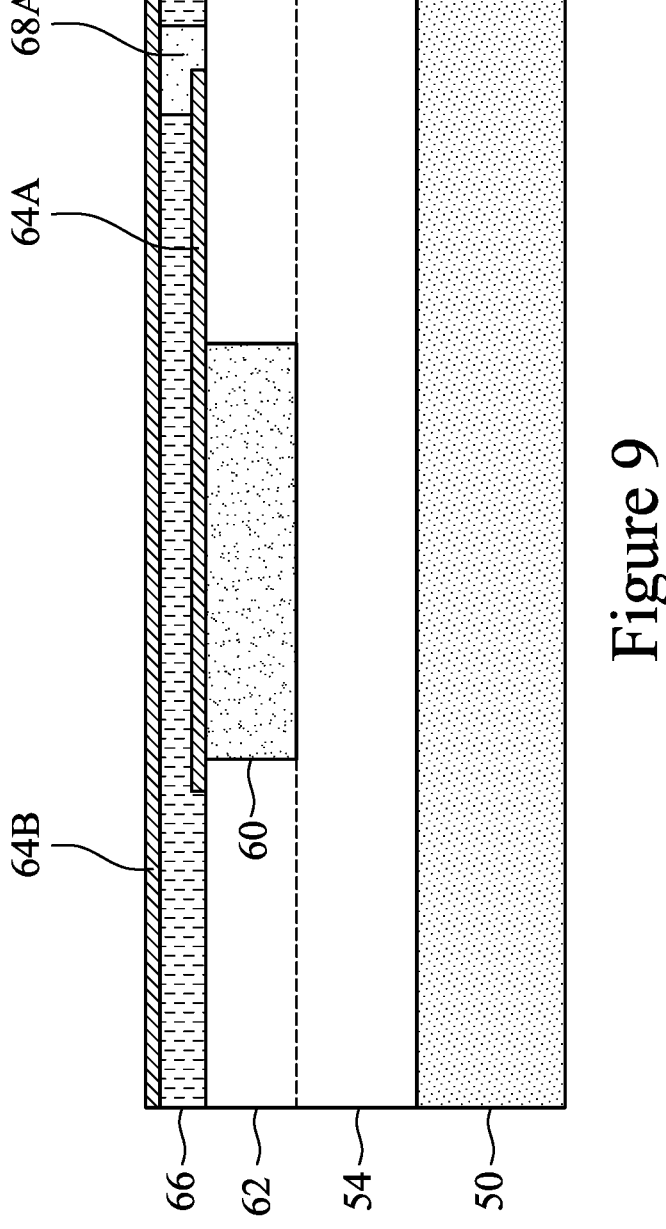

In FIG. 9, a low-dimensional material 64B is formed over the dielectric layer 66, in accordance with some embodiments. The low-dimensional material 64B may extend over the waveguides 60, the low-dimensional material 64A, and/or the conductive contact(s) 68A, in some embodiments. The low-dimensional material 64B may be similar to the low-dimensional material 64A described previously for FIG. 5, and may be formed using similar techniques. For example, in some embodiments, the low-dimensional material 64B may be graphene. Other low-dimensional materials may be used in other embodiments. In some cases, the use of multiple layers of low-dimensional materials can allow for greater control or more efficient control of the optical signal in a waveguide 60.

Figure 10:
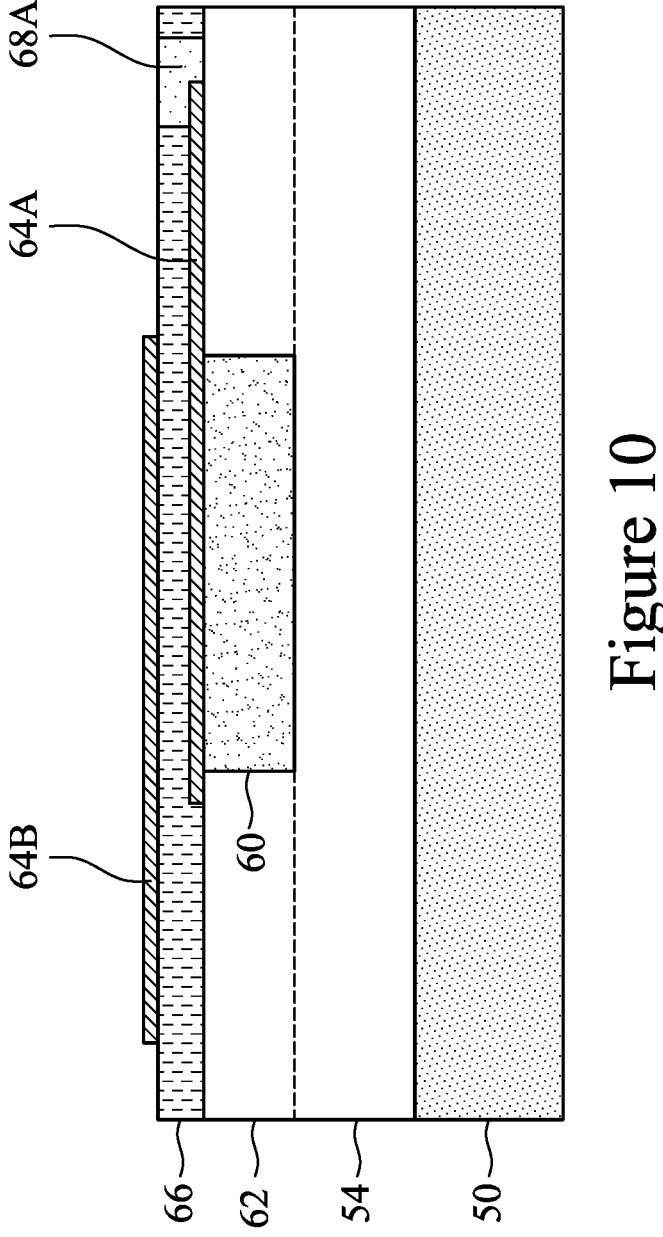

In FIG. 10, the low-dimensional material 64B is patterned, in accordance with some embodiments. The low-dimensional material 64B may be patterned using techniques similar to those described previously for FIG. 10. In some embodiments, the patterned low-dimensional material 64B may extend over the waveguides 60 and/or the low-dimensional material 64A. The low-dimensional material 64B may be removed from over the conductive contacts 68A, in some embodiments.

Figure 11:
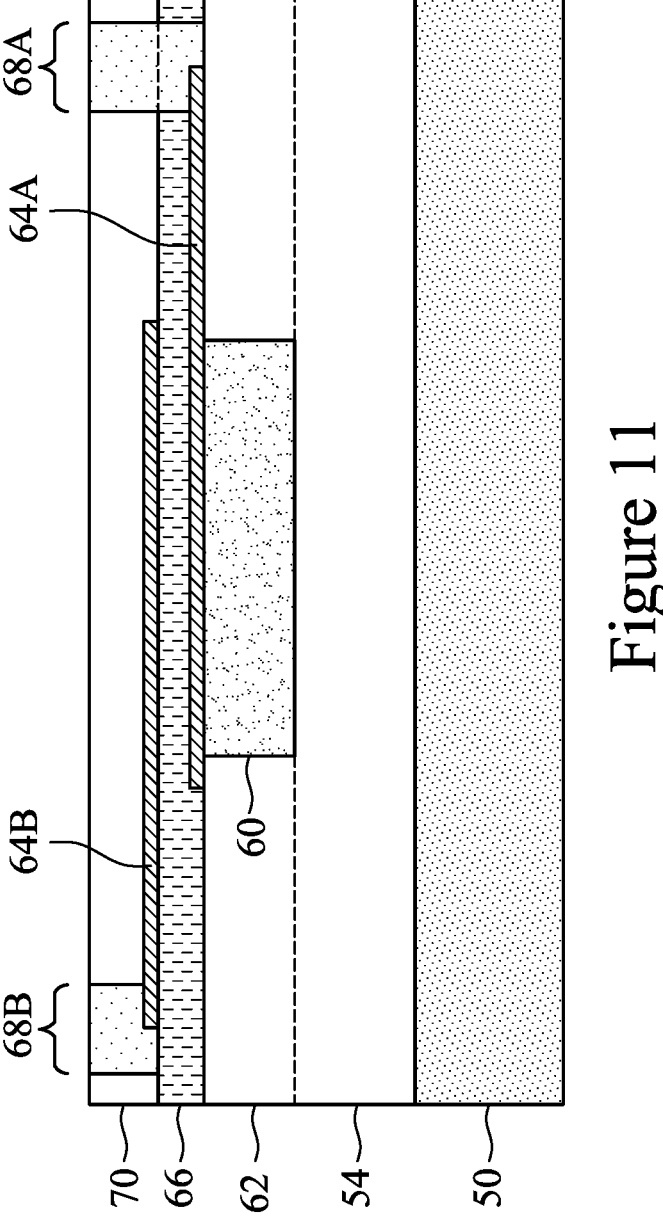

FIG. 11 illustrates the formation of a conductive contact 68B in an insulation material 70, in accordance with some embodiments. The insulation material 70 is deposited over the low-dimensional material 64A and the dielectric layer 66. The insulation material 70 may be similar to the insulation material 62 or the insulation material 54, and may be formed using similar techniques. The conductive contact 68B is physically and electrically coupled to the low-dimensional material 64B such that a current, voltage, or the like may be provided to the low-dimensional material 64B. The conductive contact 68B may be formed using materials and/or techniques similar to that of the conductive contact 68A. For example, in some embodiments, the conductive contact 68B may be formed by forming one or more openings through the insulation material 70 that expose the low-dimensional material 64B. An optional liner (not shown) and a conductive material are then formed in the openings.

In some embodiments, the conductive contact 68A may be extended through the insulation material 70 using the same process steps as for forming the conductive contact 68B. For example, an opening may also be patterned in the insulation material 70 that exposes the previously-formed portion of the conductive contact 68A. The liner and/or the conductive material may also then be deposited in the opening over the previously-formed portion of the conductive contact 68A to extend the conductive contact 68A through the insulation material 70. In some embodiments, the conductive contact 68B may also include multiple layers of conductive material formed using multiple process steps. In some embodiments, a planarization process (e.g., a CMP process) may be performed to remove excess material of the conductive contacts 68A-B. In some embodiments, after performing the planarization process, top surfaces of the insulation material 70 and the conductive contacts 68A-B may be level.

The techniques described herein may be used for forming a variety of optical devices incorporating two-dimensional materials. FIGS. 12A through 17B illustrate plan views and cross-sectional views of optical devices, in accordance with some embodiments. The embodiments of FIGS. 12A-17B may be formed using materials and/or techniques similar to those described for FIGS. 1-11, and as such some details may not be repeated. Other devices or structures using the techniques described herein are possible, and are considered within the scope of the present disclosure.

Figure 12B:
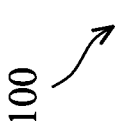
FIGS. 12A and 12B schematically illustrate a plan view and a cross-sectional view of an electro-optic modulator comprising a low-dimensional material, in accordance with some embodiments.
Figure 12B:
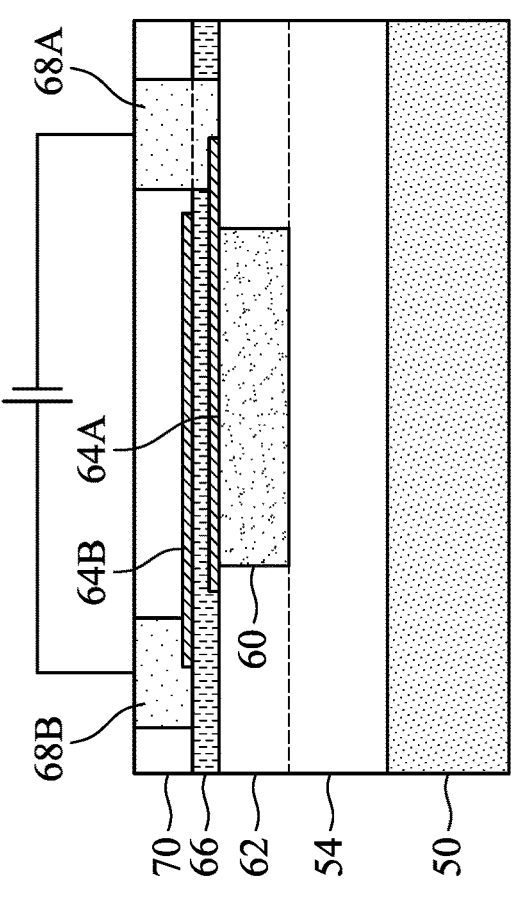
Figure 12A:
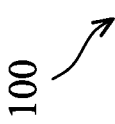
Figure 12A:
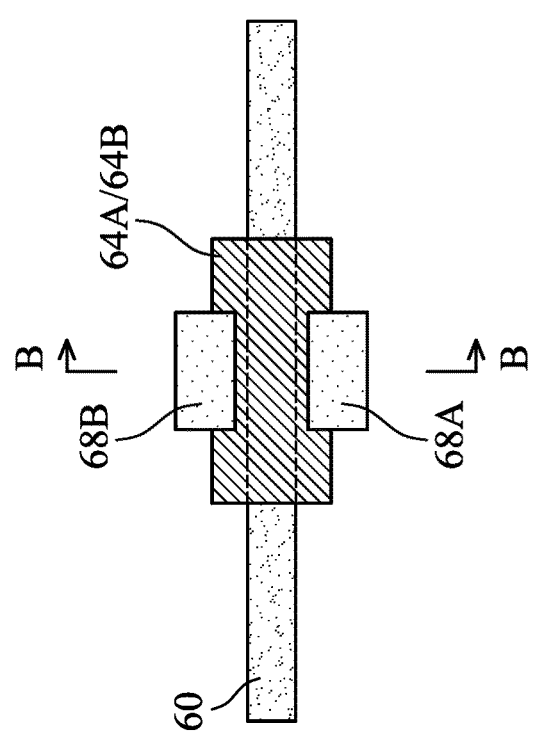

FIGS. 12A and 12B schematically illustrate a plan view and a cross-sectional view, respectively, of an electro-optic modulator 100, in accordance with some embodiments. The cross-sectional view of FIG. 12B is representative of a cross-section similar to the cross-section B-B shown in the plan view of FIG. 12A. The electro-optic modulator 100 is similar to the structure shown in FIG. 11, and may be formed using similar techniques. For example, the electro-optic modulator 100 in FIGS. 12A-12B comprises layers of low-dimensional material 64A-B over a waveguide 60. A dielectric layer 66 may be sandwiched between the layers of low-dimensional material 64A-B, as shown. Voltages may be applied to the layers of low-dimensional material 64A-B through the conductive contacts 68A-B, as schematically illustrated. In some cases, the layers of low-dimensional material 64A-B and the dielectric layer 66 may be considered a capacitor. Controlling the voltages applied to the layers of low-dimensional material 64A-B may control the absorption and/or phase of an optical signal within the waveguide 60, thus providing optical modulation of the optical signal. The electro-optic modulator 100 shown in FIGS. 12A-12B is an example, and other configurations or arrangements are possible. For example, an electro-optic modulator may be an electro-absorption modulator, a phase shifter, or the like. For example, in other embodiments, only a single layer of low-dimensional material may be used or more than two layers of low-dimensional material may be used. These and other variations are considered within the scope of the present disclosure.

Figures 13A, 13B:
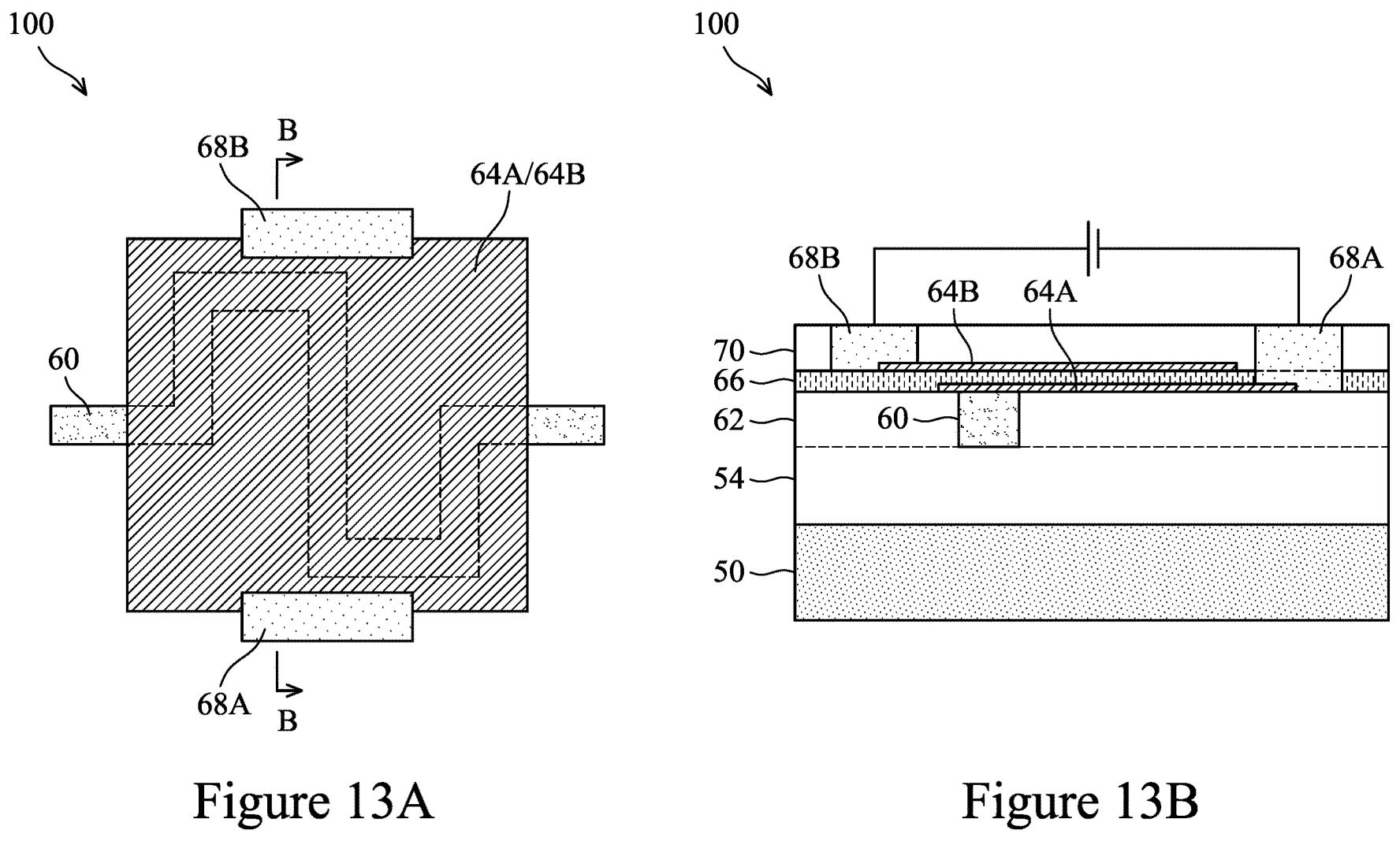

In some cases, increasing the interaction length between a waveguide and the low-dimensional material can allow for greater control or more efficient control of an optical signal in the waveguide 60. Accordingly, FIGS. 13A-13B illustrate views of an electro-optic modulator 100 having an increased interaction length. The electro-optic modulator 100 shown in FIGS. 13A-13B is similar to the electro-optic modulator 100 shown in FIGS. 12A-12B, except that the waveguide 60 curves back and forth (e.g., "meanders") underneath the low-dimensional materials 64A-B to increase the area of the waveguide 60 that interacts with the low-dimensional materials 64A-B. In this manner, the efficiency of the electro-optic modulator 100 may be improved, in some cases. This is an example, and other configurations are possible.

Figures 14A, 14B:
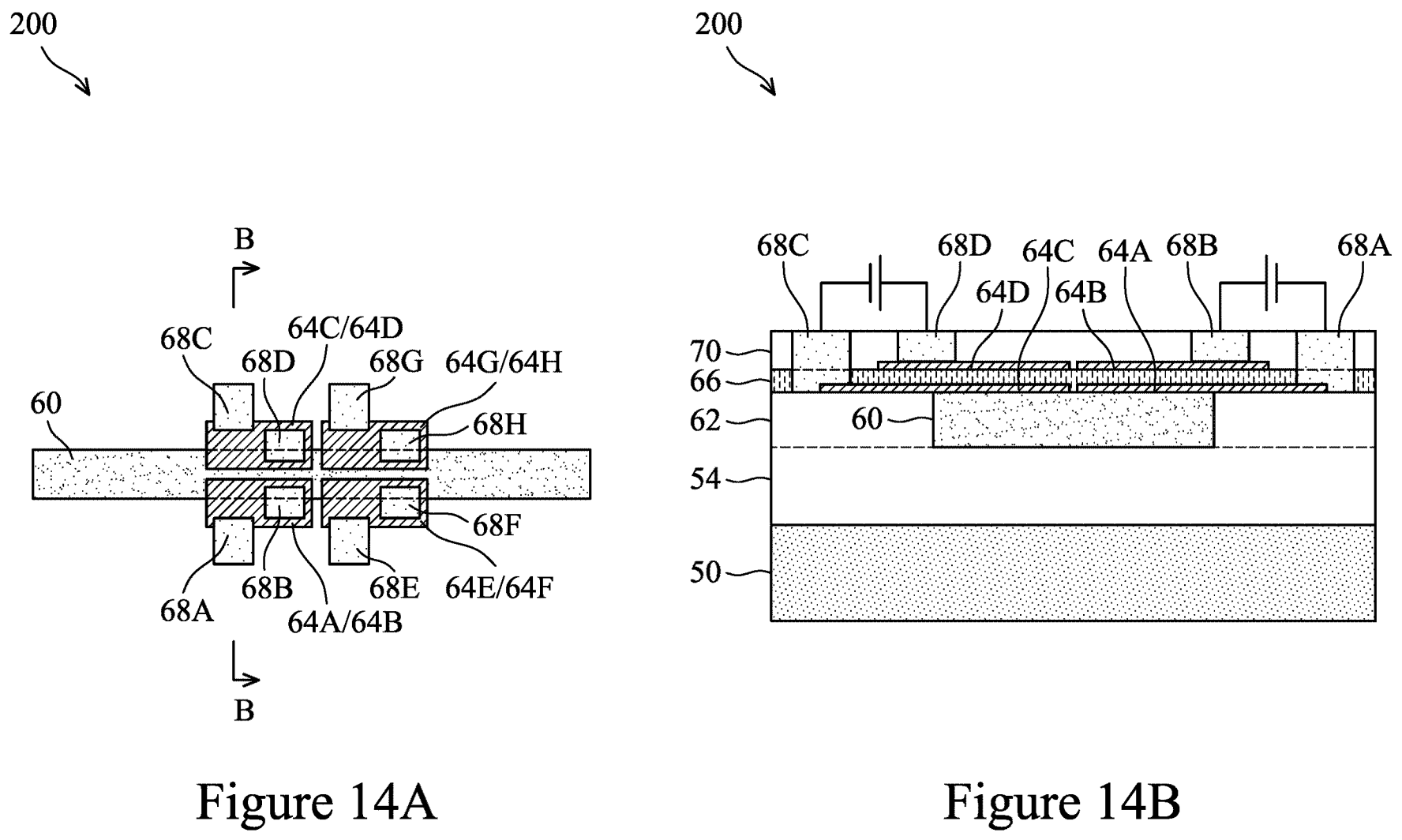

FIGS. 14A and 14B schematically illustrate a plan view and a cross-sectional view, respectively, of an electro-optic modulator 200, in accordance with some embodiments. The cross-sectional view of FIG. 14B is representative of a cross-section similar to the cross-section B-B shown in the plan view of FIG. 14A. The electro-optic modulator 200 is similar to the electro-optic modulator 100 shown in FIGS. 12A-12B, except that the lower low-dimensional material is patterned into multiple laterally-separated layers of low-dimensional material 64A/64C/64E/64G and the upper low-dimensional material is patterned into multiple laterally-separated layers of low-dimensional material 64B/64D/64F/64H. Voltages may be independently provided to each layer of low-dimensional material 64A-H. In some embodiments, voltages may be provided in parallel to pairs of layers, as shown schematically in FIG. 14B. The embodiment shown in FIG. 14A has four laterally-separated pairs of layers, but more or fewer laterally-separated layers may be formed in other embodiments. In other embodiments, additional overlying layers of low-dimensional material may be formed. The laterally-separated layers may have a different configuration or arrangement in other embodiments. By forming multiple laterally-separated layers of low-dimensional material, the optical signal in the waveguide 60 may be controlled with increased precision and efficiency. Additionally, by forming laterally-separated layers, the resistance and/or the capacitance of the low-dimensional material may be reduced, in some cases.

FIGS. 15A and 15B schematically illustrate a plan view and a cross-sectional view, respectively, of an electro-optic modulator 300 for a slot waveguide 360, in accordance with some embodiments. The cross-sectional view of FIG. 15B is representative of a cross-section similar to the cross-section B-B shown in the plan view of FIG. 15A. The electro-optic modulator 300 is similar to the electro-optic modulator 100 shown in FIGS. 12A-12B, except that the silicon nitride layer 56 is patterned to form one or more slot waveguides 360. The slot waveguides 360 may transmit optical signals or optical power, for example. The slot waveguide 360 may be patterned in addition to the waveguide 60. The slot waveguide 360 may be formed having a width in the range of about 100 nm to about 200 nm, though other widths are possible. In some embodiments, a slot waveguide 360 may be contiguous with one or more waveguides 60, and the slot waveguide 360 may be optically coupled to the adjacent waveguides 60. By applying voltages to the layers of low-dimensional material 64A-B, the optical signal within the slot waveguide 360 may be controlled (e.g., modulated). The layers of low-dimensional material 64A-B may partially cover the slot waveguide 360 or may completely cover the slot waveguide 360.

Figure 16B:
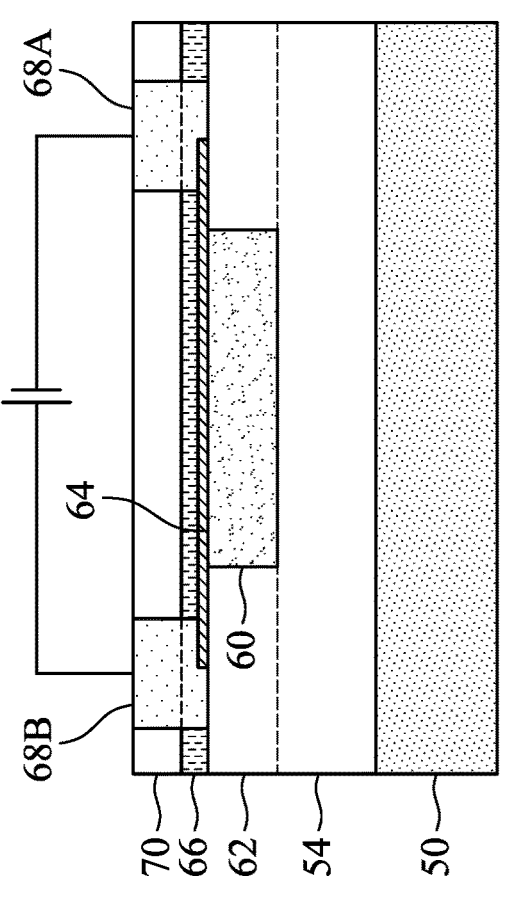
FIGS. 16A and 16B schematically illustrate a plan view and a cross-sectional view of a thermo-optic modulator comprising a low-dimensional material, in accordance with some embodiments.
Figure 16A:
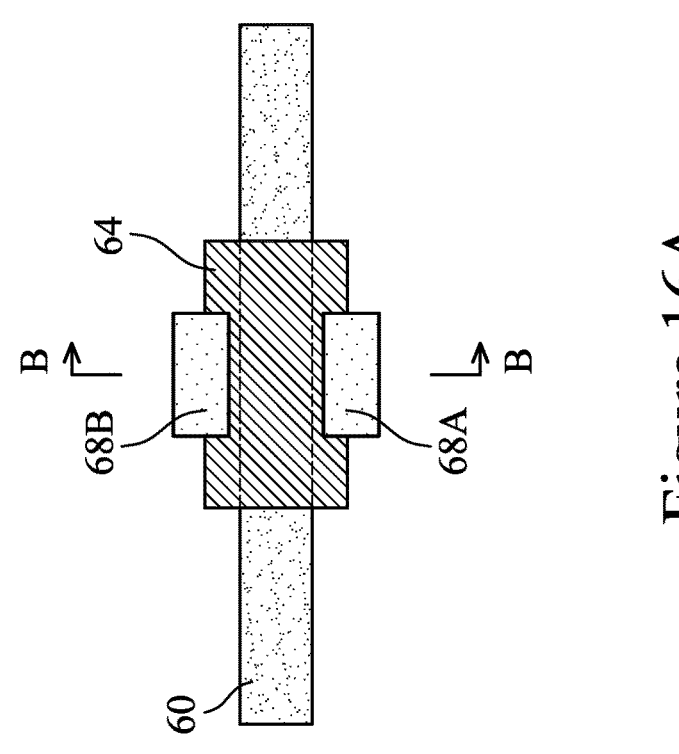

FIGS. 16A and 16B schematically illustrate a plan view and a cross-sectional view, respectively, of an thermo-optic modulator 400, in accordance with some embodiments. The cross-sectional view of FIG. 16B is representative of a cross-section similar to the cross-section B-B shown in the plan view of FIG. 16A. The thermo-optic modulator 400 is similar to the electro-optic modulator 100 shown in FIGS. 12A-12B, except that only a single layer of low-dimensional material 64 is present, and it is electrically coupled to at least two conductive contacts 68A-B. In some embodiments, the optical properties of the waveguide 60 are controlled by using the low-dimensional material 64 to heat the waveguide 60. For example, a current may be passed through the low-dimensional material 64 that causes the low-dimensional material 64 to generate heat. In this manner, the thermo-optic modulator 400 may be used, for example, as a modulator, phase shifter, or the like.

Figure 17B:
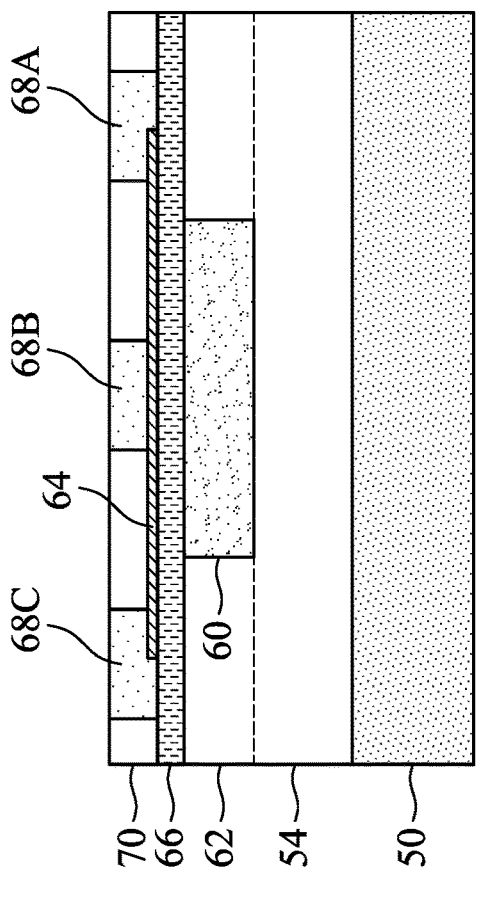
FIGS. 17A and 17B schematically illustrate a plan view and a cross-sectional view of a photodetector comprising a low-dimensional material, in accordance with some embodiments.
Figure 17A:
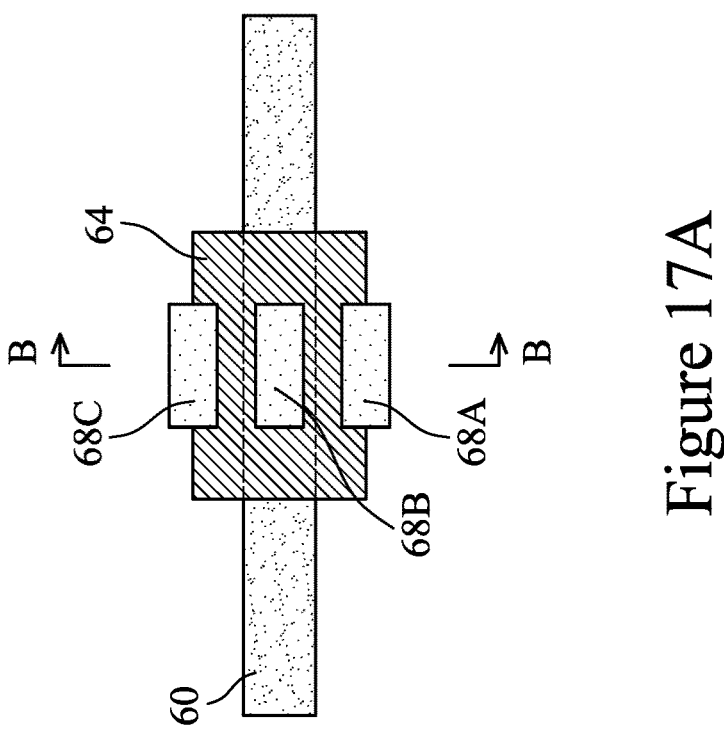

FIGS. 17A and 17B schematically illustrate a plan view and a cross-sectional view, respectively, of photodetector 500, in accordance with some embodiments. The cross-sectional view of FIG. 17B is representative of a cross-section similar to the cross-section B-B shown in the plan view of FIG. 17A. The photodetector 500 is similar to the thermo-optic modulator 400 shown in FIGS. 16A-16B, except that multiple conductive contacts 68A-C are formed on the single layer of low-dimensional material. The photodetector 500 may be configured to detect optical signals within the waveguide 60, in some embodiments. For example, in some embodiments, the presence of an optical signal within the waveguide 60 may create a detectable voltage or current change within the overlying low-dimensional material 64. As shown in FIG. 17B, in some embodiments, the low-dimensional material 64 may be formed over the dielectric layer 66. In other embodiments, the low-dimensional material 64 may be formed directly on the waveguide 60 (e.g., underneath the dielectric layer 66).

Figure 19:
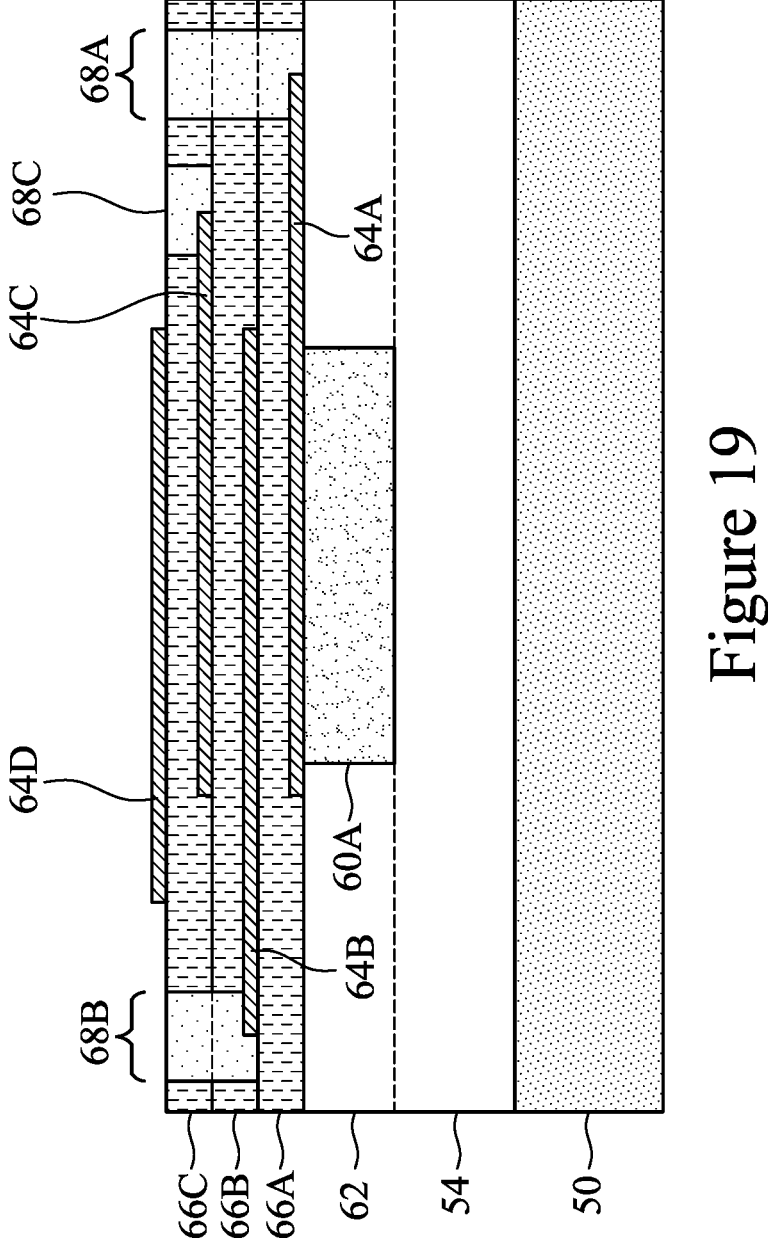
Figure 20:
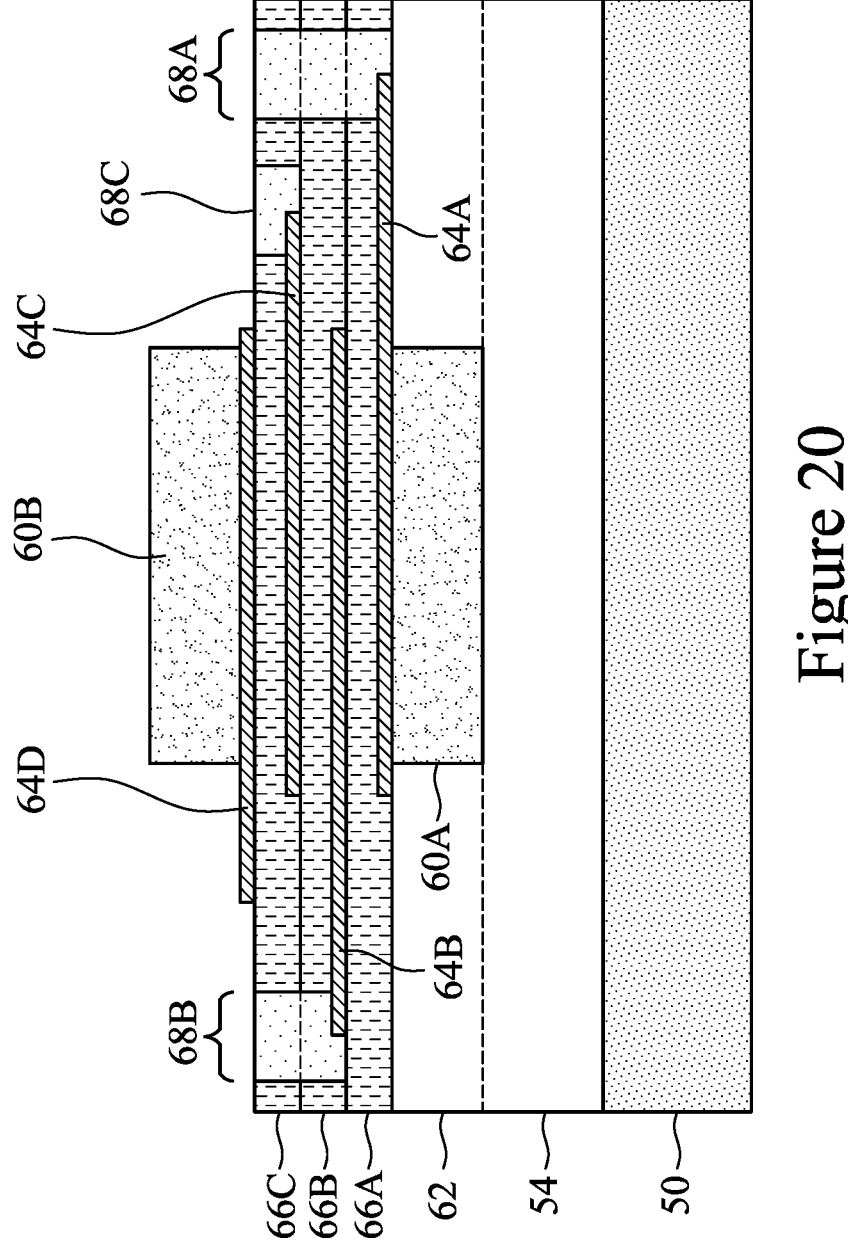
Figure 21:
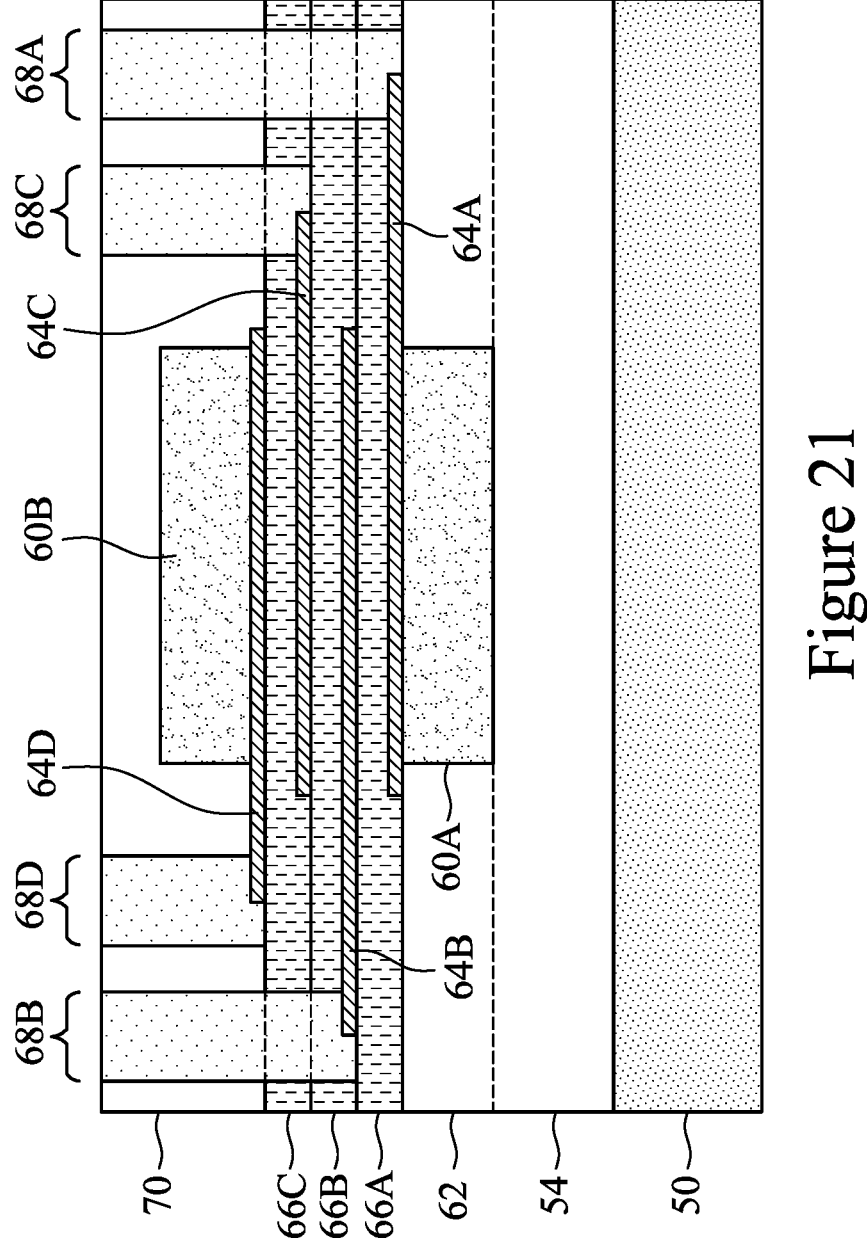

FIGS. 18-21 illustrate cross-sectional views of intermediate steps in the formation of a structure having layers of low-dimensional material 64A-D between two waveguides 60A-B, in accordance with some embodiments. The process steps shown in FIGS. 18-21 may comprise materials or techniques similar to the process steps shown in FIGS. 1-11, and thus some details may not be repeated. The structure of FIG. 21 is similar to the structure of FIG. 11, except that more layers of low-dimensional material 64C-D are formed, more dielectric layers 66B-C are formed, and an additional waveguide 60B is formed. The process steps of FIGS. 18-21 may be performed on a structure similar to that of FIG. 10, with the dielectric layer 66A of FIGS. 18-21 being similar to the dielectric layer 66 of FIG. 10. In some embodiments, voltages may be applied to the upper layers of low-dimensional material 64C-D to modulate optical signals in the upper waveguide 60B, and voltages may be independently applied to the lower layers of low-dimensional material 64A-B to modulate optical signals in the lower waveguide 60A. In other embodiments, voltages may be applied to the layers of low-dimensional material 64A-D to modulate an optical signal that is carried by both waveguides 60A-B.

Figure 18:
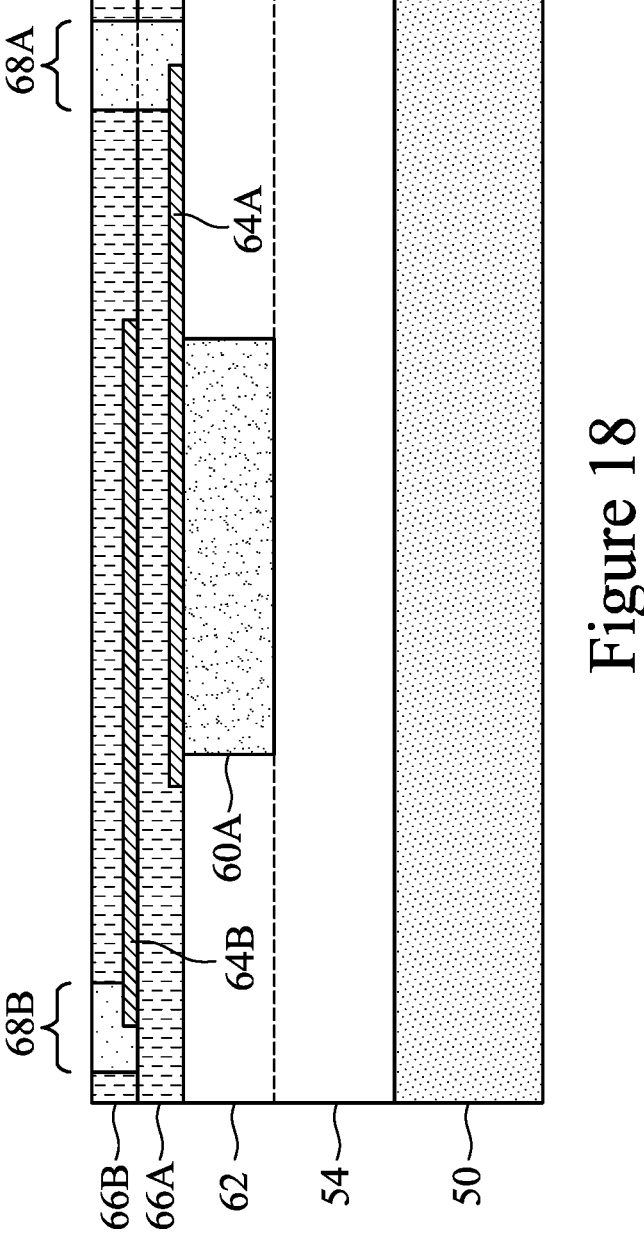
FIGS. 18, 19, 20, and 21 illustrate cross-sectional views of intermediate steps in the formation of a photonic device comprising a low-dimensional material, in accordance with some embodiments.

In FIG. 18, a dielectric layer 66B is formed over the low-dimensional material 64B, and conductive contact 68B is formed, in accordance with some embodiments. The dielectric layer 66B may be formed using similar materials or techniques as described previously for the dielectric layer 66 of FIG. 7, in some embodiments. The conductive contact 68B may be formed using similar materials or techniques as described previously for the conductive contact 68B of FIG. 11, in some embodiments. As shown in FIG. 18, additional material of the conductive contact 68A may also be formed. After forming the conductive contact 68B, a planarization process (e.g. a CMP process or the like) may be performed, in some embodiments.

In FIG. 19, layers of low dimensional material 64C and 64D are formed, in accordance with some embodiments. The layers of low-dimensional material 64C-D may be formed in a similar manner as the layers of low-dimensional material 64A-B described previously. For example, a layer of low-dimensional material 64C may be formed over the dielectric layer 66B and patterned. A dielectric layer 66C may then be formed over the low-dimensional material 64C using materials or techniques similar to those of the dielectric layer 66B. A conductive contact 68C may be formed in the dielectric layer 66C that physically and electrically contacts the low-dimensional material 64C. Additional material of the conductive contacts 68A and 68B may also be formed, in some embodiments. A layer of low-dimensional material 64D may be formed over the dielectric layer 66C and patterned. Additional overlying layers of low-dimensional material may be formed in other embodiments. The additional overlying layers of low-dimensional material may be separated by dielectric layers, in these other embodiments.

In FIG. 20, a waveguide 60B is formed over the low-dimensional material 64D, in accordance with some embodiments. The waveguide 60B may be formed using techniques similar to that of the waveguide 60A. For example, a layer of silicon nitride may be deposited and then patterned using suitable photolithography and etching techniques. The waveguide 60B may be a separate waveguide that transmits optical signals or optical power independently of the waveguide 60A, or may be part of a single two-layer waveguide that transmits the same optical signal or optical power using both the waveguide 60A and the waveguide 60B. Other configurations or arrangements are possible.

In FIG. 21, a conductive contact 68D is formed, in accordance with some embodiments. The conductive contact 68D may be formed in a manner similar to the conductive contact 68B of FIG. 11. For example, an insulation material 70 may be formed over the waveguide 60B, low-dimensional material 64D, and/or dielectric layer 66C. The insulation material 70 may be similar to the insulation material 70 of FIG. 11, and may be formed using similar techniques. The conductive contact 68D may then be formed in the insulation material 70 to physically and electrically contact the low-dimensional material 64D. Additional material of the conductive contacts 68A-C may also be formed, in some embodiments.

Figure 22B:
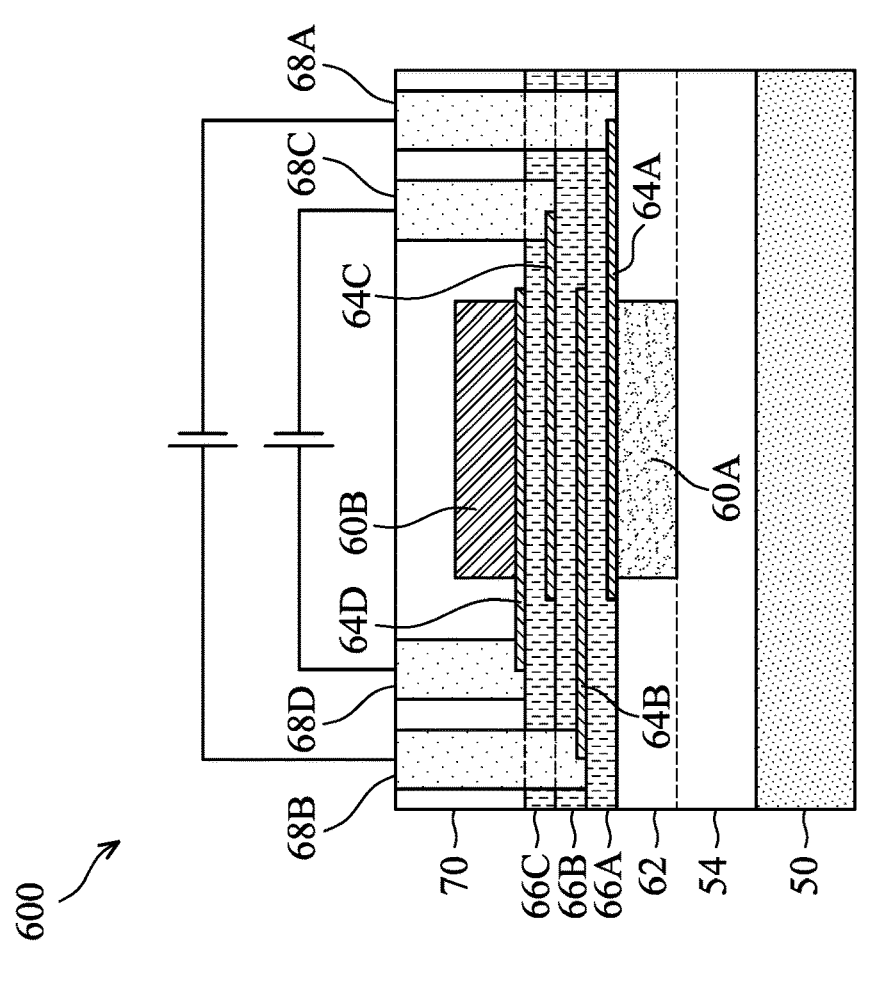
FIGS. 22A and 22B schematically illustrate a plan view and a cross-sectional view of an electro-optic modulator comprising a low-dimensional material, in accordance with some embodiments.
Figure 22A:
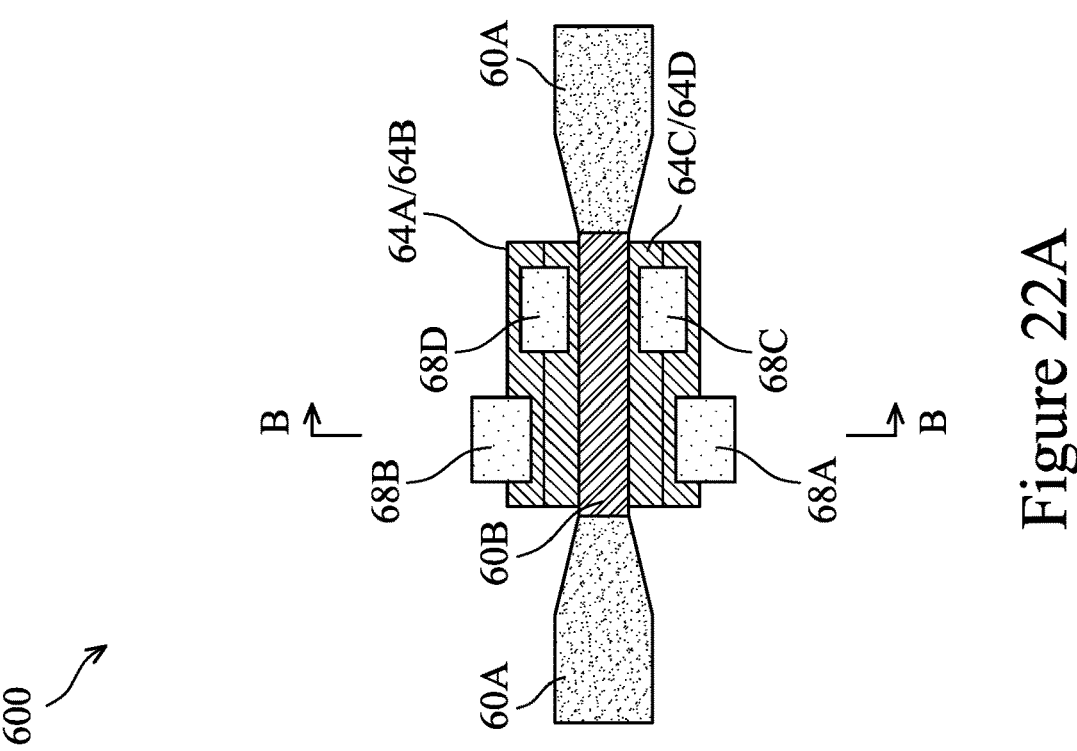

FIGS. 22A and 22B schematically illustrate a plan view and a cross-sectional view, respectively, of an electro-optic modulator 600, in accordance with some embodiments. The cross-sectional view of FIG. 22B is representative of a cross-section similar to the cross-section B-B shown in the plan view of FIG. 22A. The electro-optic modulator 100 is similar to the structure shown in FIG. 21, and may be formed using techniques similar to those described for FIGS. 18-21. For example, the electro-optic modulator 600 in FIGS. 22A-22B comprises layers of low-dimensional material 64A-D between waveguides 60A-B. The layers of low-dimensional material 64A-D may be respectively separated by dielectric layers 66A-C. FIGS. 22A-22B illustrate an embodiment in which the lower nitride layer 60A tapers to a smaller width beneath the low-dimensional material 64A-D, but in other embodiments the width may not taper or may taper to a different width. Controlling the voltages applied to the layers of low-dimensional material 64A-D may control the absorption and/or phase of an optical signal within the waveguides 60A-B, thus providing optical modulation of the optical signal. The electro-optic modulator 600 shown in FIGS. 22A-22B is an example, and modulators or phase shifters having other configurations or arrangements are possible. For example, in other embodiments, more or fewer layers of low-dimensional material may be used. These and other variations are considered within the scope of the present disclosure.

Figure 25:
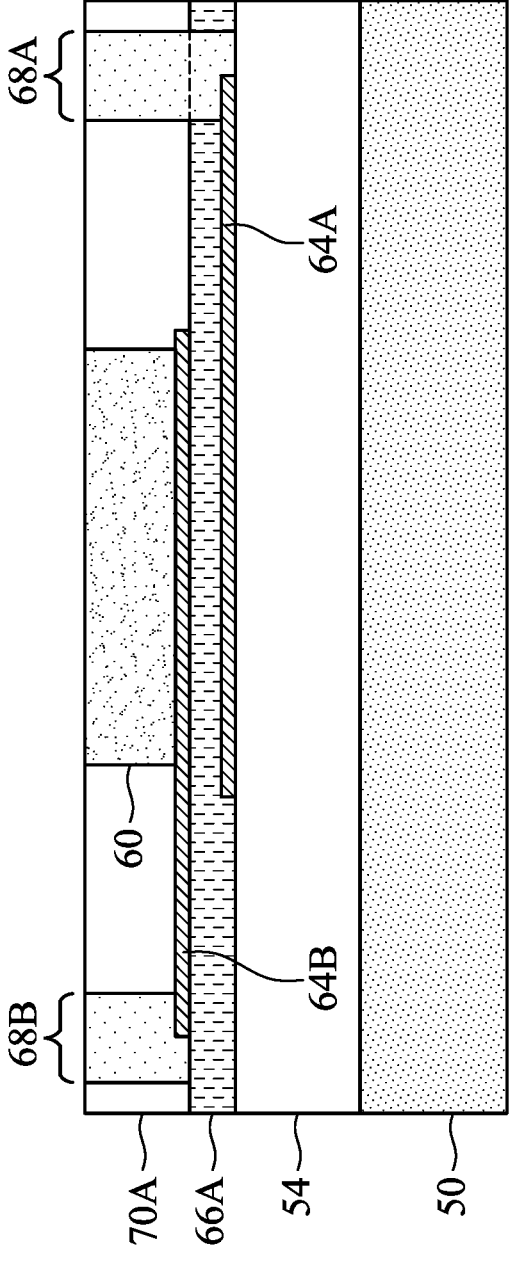
Figure 26:
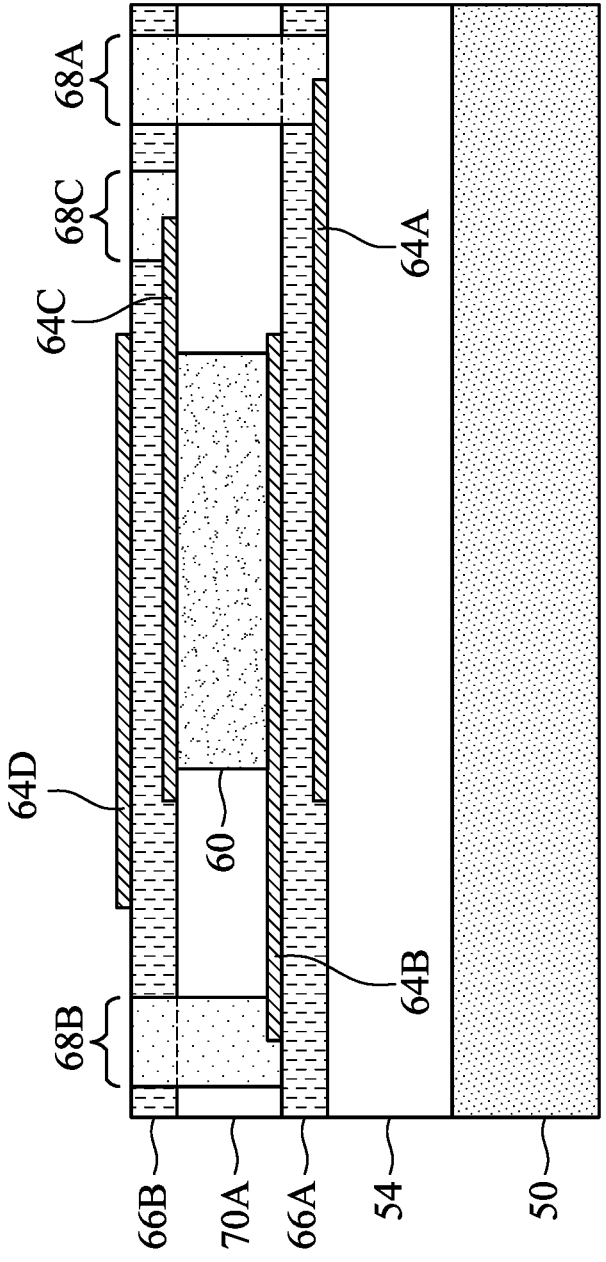
Figure 27:
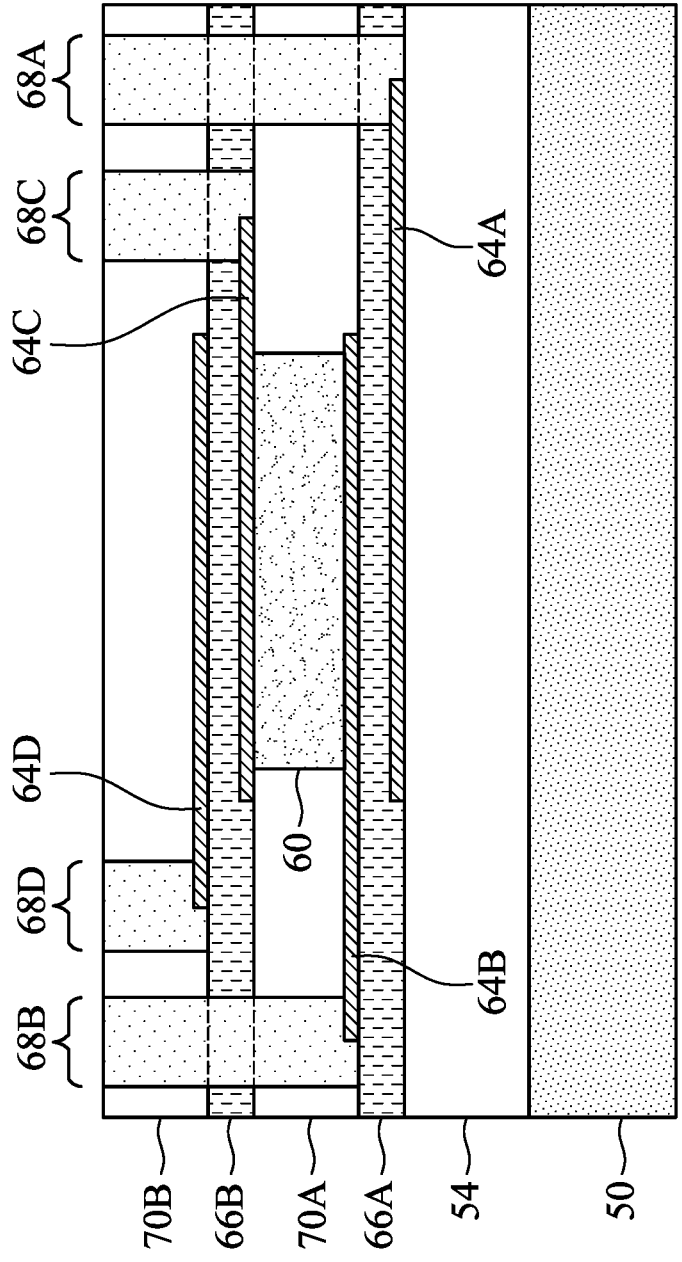

FIGS. 23-27 illustrate cross-sectional views of intermediate steps in the formation of a structure having a waveguide 60 between layers of low-dimensional material 64A-D, in accordance with some embodiments. The process steps shown in FIGS. 23-27 may comprise materials or techniques similar to the process steps shown in FIGS. 1-11 or FIGS. 18-21, and thus some details may not be repeated. The structure of FIG. 27 is similar to the structure of FIG. 11, except that two layers of low-dimensional material 64A-B are formed under the waveguide 60, and two layers of low-dimensional material 64C-D are formed over the waveguide 60. More than two layers of low-dimensional material may be formed above or below the waveguide 60, in other embodiments. Forming layers of low-dimensional material both above and below a waveguide in this manner can allow for more control or more efficient control of the optical signals within the waveguide.

Figure 23:
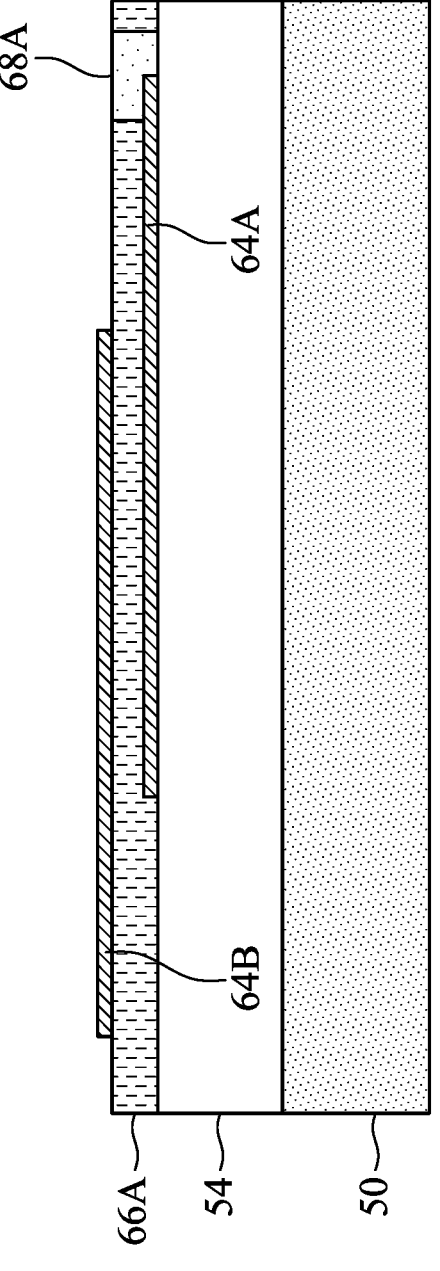
FIGS. 23, 24, 25, 26, and 27 illustrate cross-sectional views of intermediate steps in the formation of a photonic device comprising a low-dimensional material, in accordance with some embodiments.

In FIG. 23, layers of low-dimensional material 64A and 64B are formed on the insulation material 54, in accordance with some embodiments. The layers of low-dimensional material 64A-B may be formed in a similar manner as the layers of low-dimensional material 64A-B described previously for FIGS. 5-10. For example, a layer of low-dimensional material 64A may be formed over the insulation material 54 and patterned. A dielectric layer 66A may then be formed over the low-dimensional material 64A using materials or techniques similar to those described previously. A conductive contact 68A may be formed in the dielectric layer 66A that physically and electrically contacts the low-dimensional material 64A. A layer of low-dimensional material 64B may be formed over the dielectric layer 66A and patterned. Additional overlying layers of low-dimensional material may be formed in other embodiments. The additional overlying layers of low-dimensional material may be separated by dielectric layers, in these other embodiments.

Figure 24:
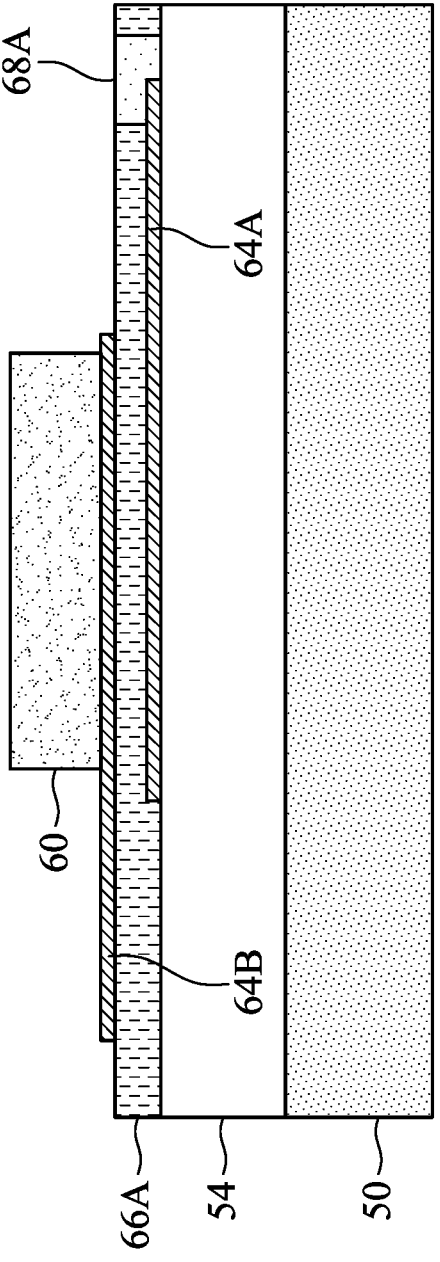

In FIG. 24, the waveguide 60 is formed on the low-dimensional material 64B, in accordance with some embodiments. The waveguide 60 may be formed using materials or techniques described previously. For example, a layer of silicon nitride may be deposited and patterned using suitable photolithography and etching techniques.

In FIG. 25, a conductive contact 68B is formed, in accordance with some embodiments. The conductive contact 68B may be formed in a manner similar to the conductive contact 68B of FIG. 11. For example, an insulation material 70A may be formed over the waveguide 60, low-dimensional material 64B, and/or dielectric layer 66A. The insulation material 70A may be similar to the insulation material 70 of FIG. 11, and may be formed using similar techniques. The conductive contact 68B may then be formed in the insulation material 70A to physically and electrically contact the low-dimensional material 64B. Additional material of the conductive contact 68A may also be formed, in some embodiments. In some embodiments, a planarization process (e.g., a CMP process) may be performed such that top surfaces of the insulation material 70A, the waveguide 60, and/or the conductive contacts 68A-B are level.

In FIG. 26, layers of low-dimensional material 64C and 64D are formed over the waveguide 60, in accordance with some embodiments. The layers of low-dimensional material 64C-D may be formed in a manner similar to that of the layers of low-dimensional material 64A-B. For example, a layer of low-dimensional material 64C may be formed on the waveguide 60 and patterned, a dielectric layer 66B may be formed over the low-dimensional material 64C, and then a layer of low-dimensional material 64D may be formed on the dielectric layer 66B and patterned. A conductive contact 68C may be formed in the dielectric layer 66B to physically and electrically contact the low-dimensional material 64C. Additional material of the conductive contacts 68A-B may also be formed, in some embodiments.

In FIG. 27, a conductive contact 68D is formed, in accordance with some embodiments. For example, an insulation material 70B may first be formed over the low-dimensional material 64D and the dielectric layer 66B. The insulation material 70B may be similar to the insulation material 70A and may be formed using similar techniques. The conductive contact 68D may then be formed in the insulation material 70B to physically and electrically contact the low-dimensional material 64D. Additional material of the conductive contacts 68A-C may also be formed, in some embodiments.

Figures 28A, 28B:
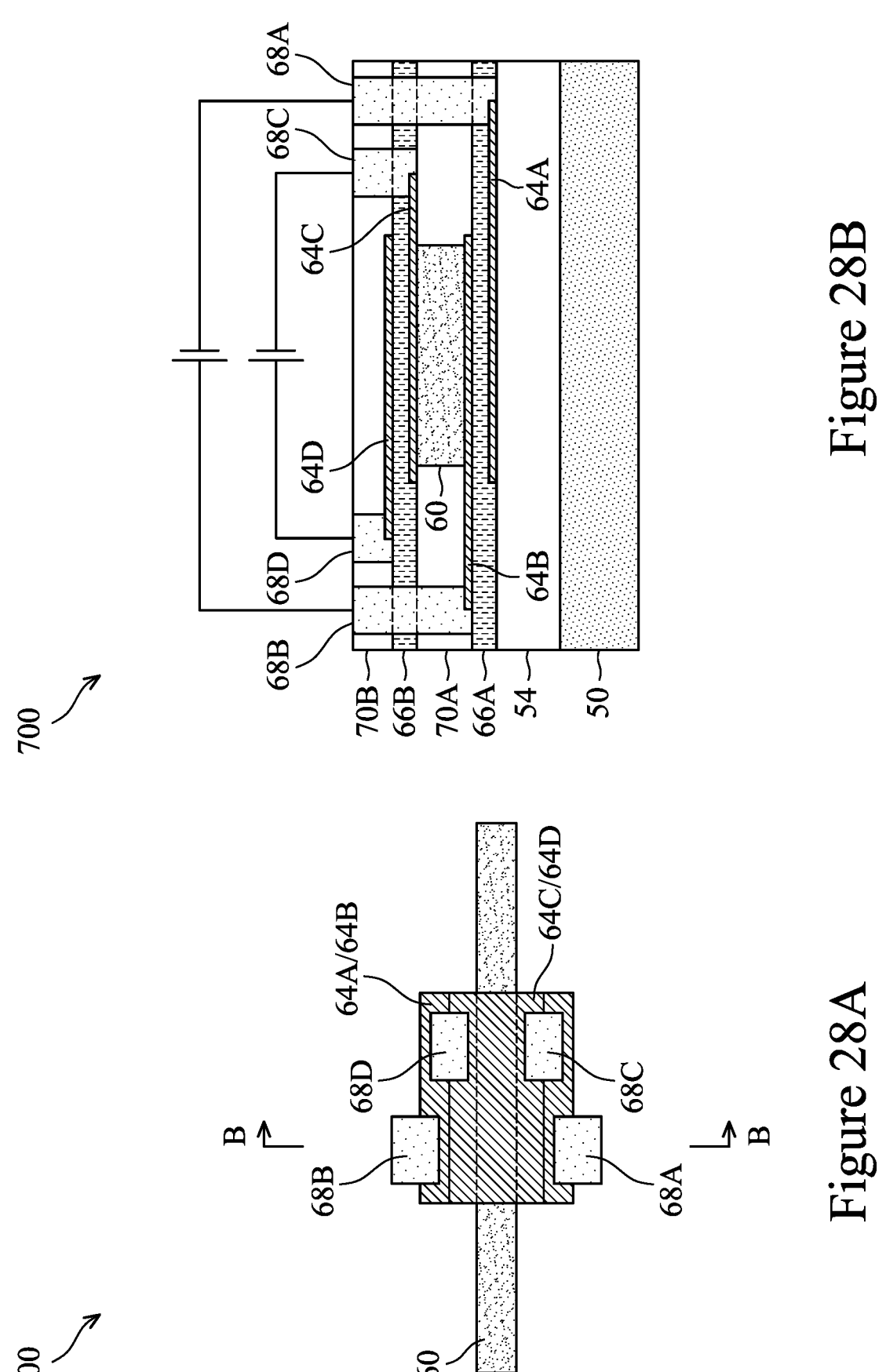
FIGS. 28A and 28B schematically illustrate a plan view and a cross-sectional view of an electro-optic modulator comprising a low-dimensional material, in accordance with some embodiments.

FIGS. 28A and 28B schematically illustrate a plan view and a cross-sectional view, respectively, of an electro-optic modulator 700, in accordance with some embodiments. The cross-sectional view of FIG. 28B is representative of a cross-section similar to the cross-section B-B shown in the plan view of FIG. 28A. The electro-optic modulator 700 is similar to the structure shown in FIG. 27, and may be formed using techniques similar to those described for FIGS. 23-27. For example, the electro-optic modulator 700 in FIGS. 28A-28B comprises a waveguide 60 sandwiched between multi-layers of low-dimensional material 64A-D. The layers of low-dimensional material 64A-B and 64C-D may be respectively separated by dielectric layers 66A and 66B. Controlling the voltages applied to the layers of low-dimensional material 64A-D may control the absorption and/or phase of an optical signal within the waveguide 60, thus providing optical modulation of the optical signal. The electro-optic modulator 700 shown in FIGS. 28A-28B is an example, and other configurations or arrangements are possible. For example, in other embodiments, more or fewer layers of low-dimensional material may be used or additional waveguides may be formed. These and other variations are considered within the scope of the present disclosure.

Figure 29A:
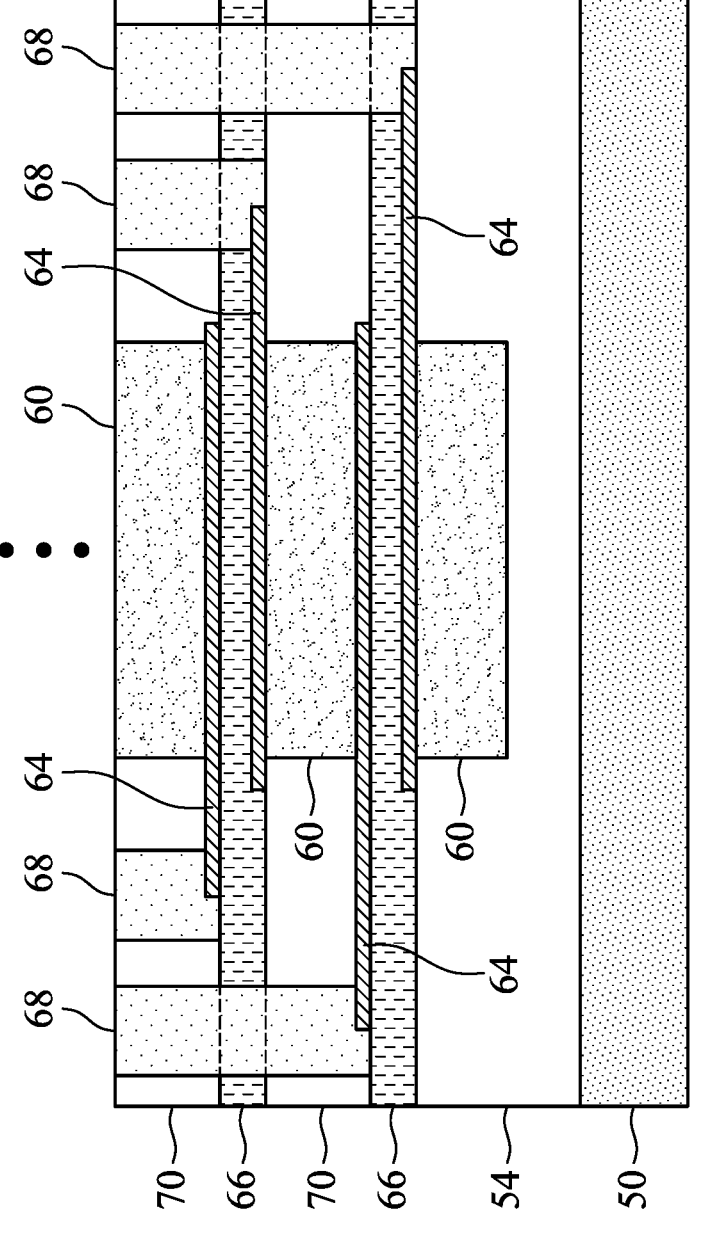
FIGS. 29A and 29B illustrate cross-sectional views of electro-optic modulators comprising a low-dimensional material, in accordance with some embodiments.
Figure 29B:
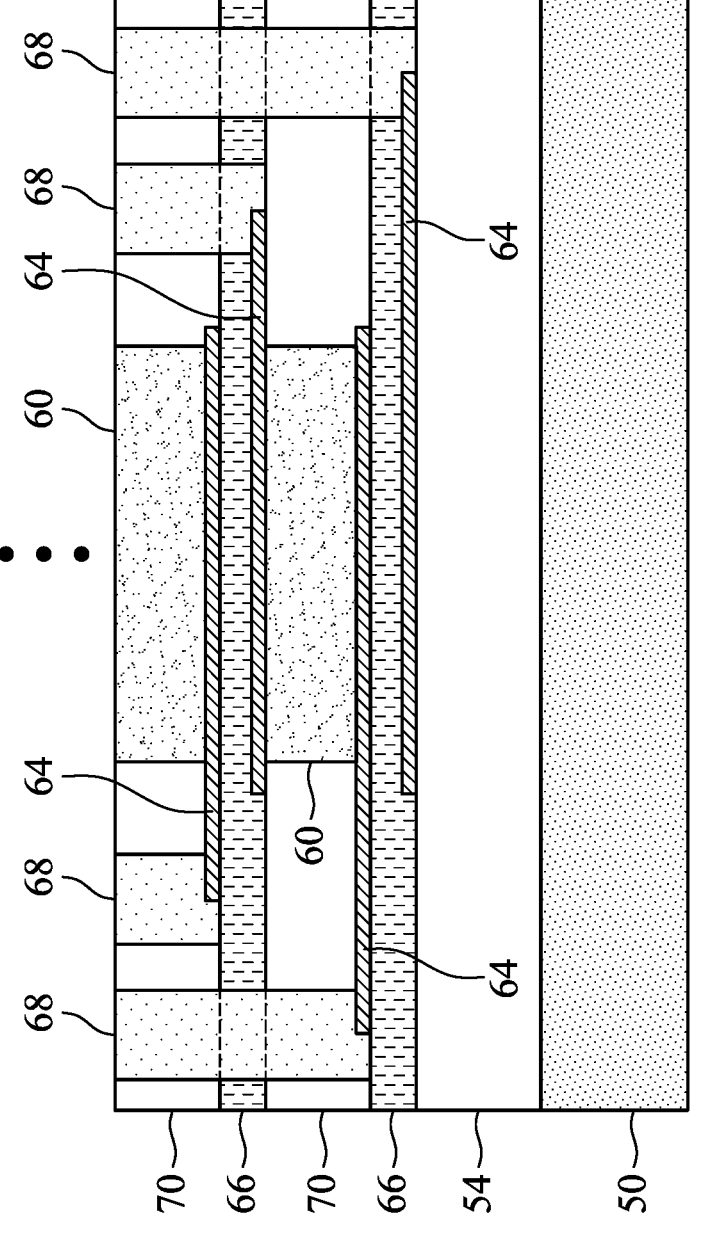

The techniques described herein may be used to create photonic structures (e.g., electro-optical modulators, electro-absorption modulators, phase shifters, or the like) comprising a stack of multiple layers of low-dimensional material 64 and multiple waveguides 60. Two example photonic structures 800 and 850 are shown, respectively, in FIGS. 29A and 29B. The photonic structures 800/850 comprise layers of low-dimensional material 64 alternating with waveguides 60 in a stack-like arrangement. Other configurations or arrangements are possible. For example, a photonic structure may be formed having more or more or fewer layers of low-dimensional material or more or fewer waveguides. FIG. 29A illustrates a photonic structure 800 comprising layers of low-dimensional material 64 sandwiched between overlying and underlying waveguides 60, in accordance with some embodiments. The embodiment shown in FIG. 29A may be formed using process steps similar to those described previously for FIGS. 18-20, for example. FIG. 29B illustrates a photonic structure 850 comprising waveguides 60 sandwiched between overlying and underlying layers of low-dimensional material 64, in accordance with some embodiments. The embodiment shown in FIG. 29B may be formed using process steps similar to those described previously for FIGS. 23-26, for example. The process steps used to form the photonic structures 800/850 may be repeated to form photonic structures having any suitable number of waveguides 60 and layers of low-dimensional material 64.

Figure 30:
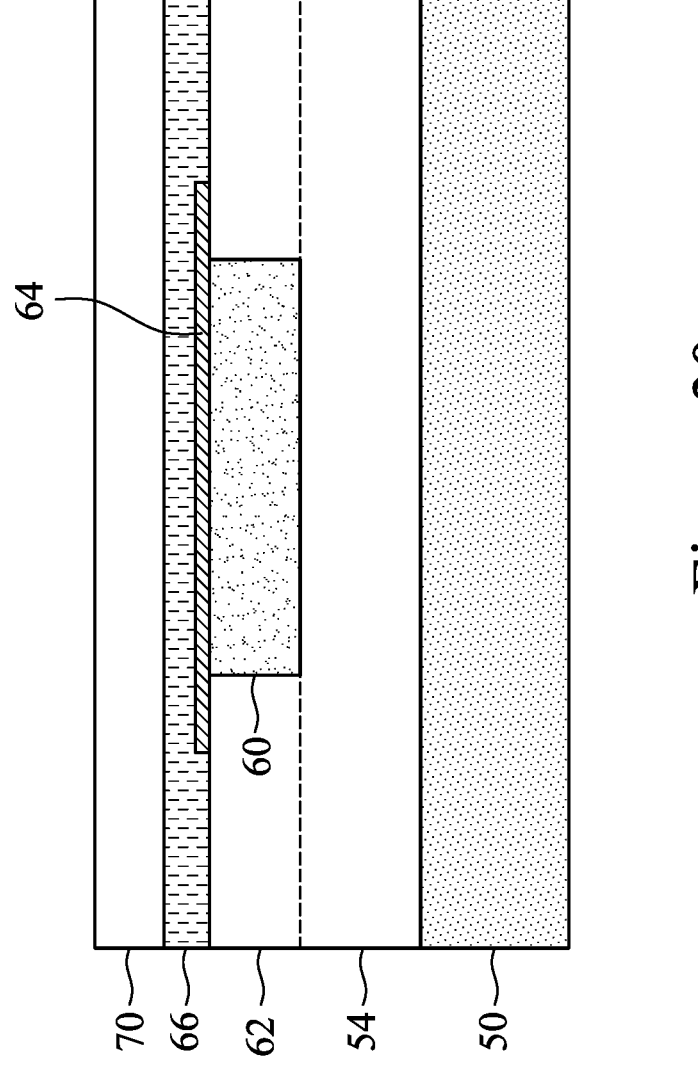
FIG. 30 illustrates a cross-sectional view of a photonic structure comprising a low-dimensional material, in accordance with some embodiments.

In some cases, a low-dimensional material may be formed over a waveguide to passively affect the optical properties of the waveguide. An example photonic structure 900 is shown in FIG. 30, in which a low-dimensional material 64 is formed on a waveguide 60. The photonic structure 900 may be formed using similar materials or techniques as those described previously. In some cases, the effective refractive index of a waveguide may be at least partially dependent on the dimensions (e.g., width and/or thickness) of the waveguide. By forming a passive layer of low-dimensional material 64 over a waveguide 60 as described herein, the effective refractive index of the waveguide 60 may be tuned instead of changing the dimensions of the waveguide. In some embodiments, the layer of low-dimensional material 64 may be formed to tune the effective refractive index in order to compensate for the dimensions of the waveguide. For example, forming an overlying low-dimensional material having a relatively high refractive index can reduce the effective refractive index of the underlying waveguide, in some cases. In other cases, forming an overlying low-dimensional material having a relatively low refractive index can increase the effective refractive index of the underlying waveguide. Examples of low-dimensional materials having a relatively high refractive index include transition-metal dichalcogenides (TMD) such as $MoS_2$, $WS_2$, $MoSe_2$, or the like. Examples of low-dimensional materials having a relatively low refractive index include graphene and hBN. Other materials having various refractive indices are possible. In other embodiments, more than one passive layer of low-dimensional material may be used.

Figures 31A, 31B, 31C:
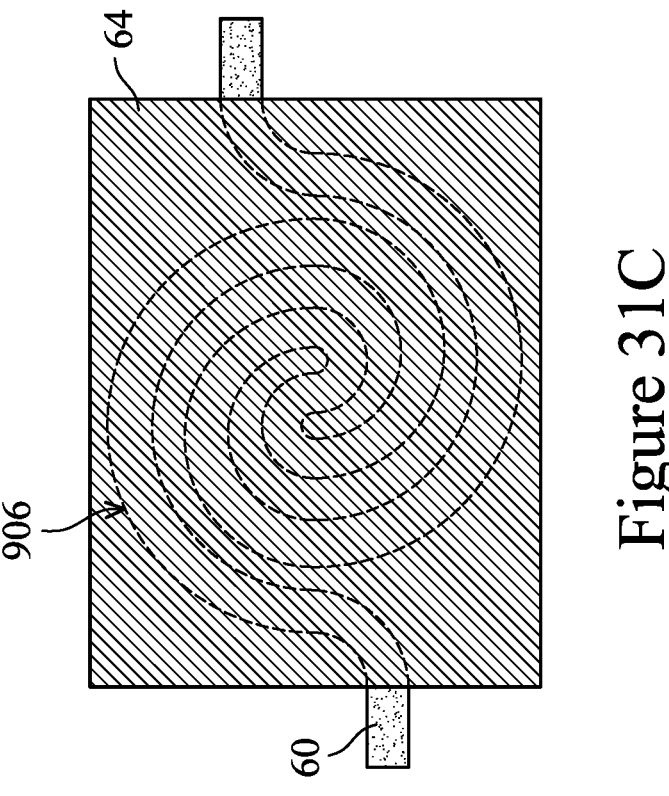
FIGS. 31A, 31B, and 31C illustrate plan views of photonic structures comprising a low-dimensional material, in accordance with some embodiments.

FIGS. 31A-31C illustrate photonic structures comprising a passive low-dimensional material 64, in accordance with some embodiments. The photonic structures shown in FIGS. 31A-31C are examples, and other photonic structures are possible. FIG. 31A illustrates a structure comprising waveguides 60 coupled to a multi-mode interferometer (MMI) 902, in accordance with some embodiments. The MMI 902 may be formed using similar materials or techniques as the waveguides 60. The structure shown in FIG. 31A comprises two input waveguides 60 and two output waveguides 60 that are coupled by the MMI 902. The MMI 902 is covered by a layer of low-dimensional material 64, which passively adjusts the effective refractive index of the MMI 902. FIG. 31B illustrates a structure comprising a waveguide 60 coupled to a ring oscillator 904, in accordance with some embodiments. The ring oscillator 904 may be formed using similar materials or techniques as the waveguides 60. The structure shown in FIG. 31B comprises a waveguide 60 adjacent the ring oscillator 904 such that an optical signal may be coupled between the waveguide and the ring oscillator 904. The ring oscillator 904 is covered by a layer of low-dimensional material 64, which passively adjusts the effective refractive index of the ring oscillator 904. FIG. 31C illustrates a structure comprising a waveguide 60 coupled to a spiral time-delay line 906, in accordance with some embodiments. The spiral time-delay line 906 may be formed using similar materials or techniques as the waveguides 60. The spiral time-delay line 906 is covered by a layer of low-dimensional material 64, which passively adjusts the effective refractive index of the spiral time-delay line 906.

Figures 32A, 32B:
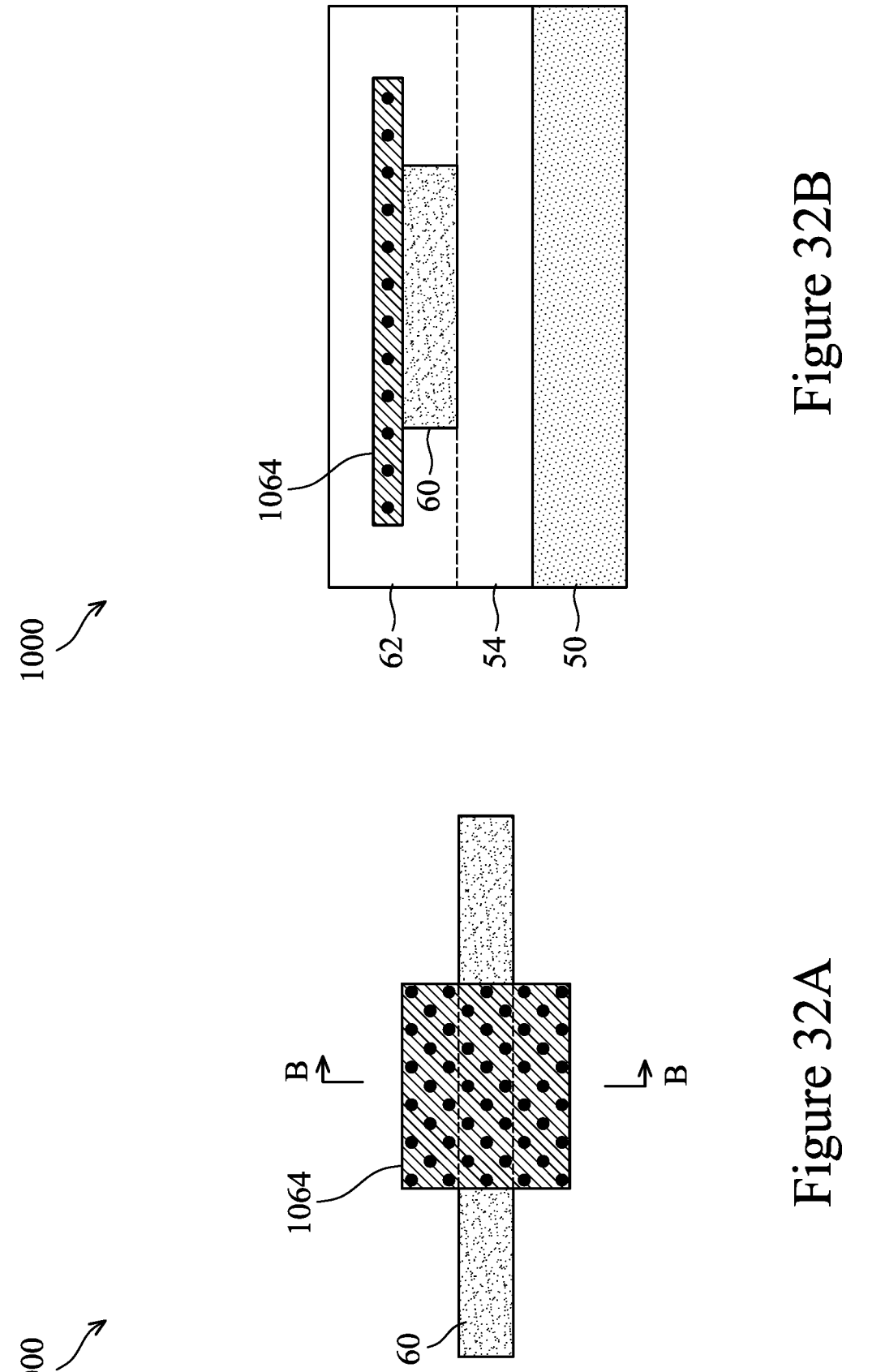
FIGS. 32A and 32B schematically illustrate a plan view and a cross-sectional view of photon memory device comprising a low-dimensional material, in accordance with some embodiments.

FIGS. 32A and 32B illustrate a photon memory device woo comprising a low-dimensional material 1064, in accordance with some embodiments. The cross-sectional view of FIG. 32B is representative of a cross-section similar to the cross-section B-B shown in the plan view of FIG. 32A. The photon memory device woo may comprise, for example, a layer of low-dimensional material 1064 formed over a waveguide 60. The layer of low-dimensional material 1064 may be a material having defects, nanostructures, quantum dots, or the like that allow photons to be coupled from the waveguide 60 and stored within the low-dimensional material 1064. In this manner, the low-dimensional material 1064 may be used as part of a photon memory device woo. The low-dimensional material 1064 may be, for example, hBN or $WSe_2$, though other materials are possible. In some cases, a photon stored in the low-dimensional material 1064 may be "read" by supplying a magnetic field to the low-dimensional material. The waveguide 60 and the low-dimensional material 1064 may be formed using materials or techniques described previously.

Figure 33B:
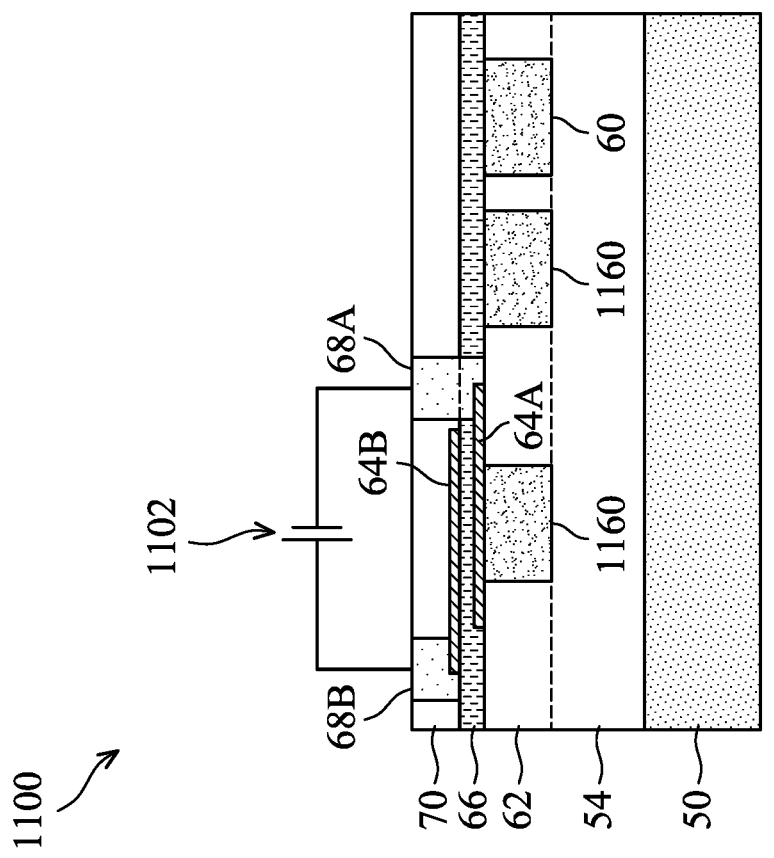
FIGS. 33A and 33B schematically illustrate a plan view and a cross-sectional view of photon memory device comprising a low-dimensional material, in accordance with some embodiments.
Figure 33A:
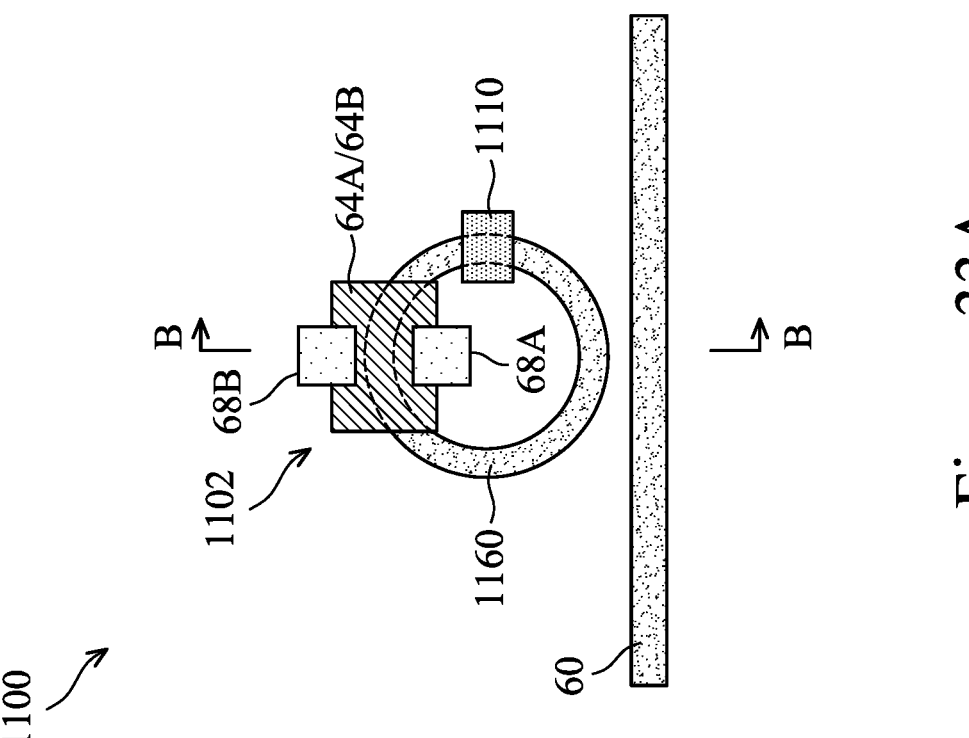

FIGS. 33A and 33B illustrate a photon memory device 1100 comprising an electro-optic modulator 1102 having layers of low-dimensional material 64A-B, in accordance with some embodiments. The cross-sectional view of FIG. 32B is representative of a cross-section similar to the cross-section B-B shown in the plan view of FIG. 32A. The electro-optic modulator 1102 is formed over a ring oscillator 1160, and may be similar to the electro-optic modulator 100 described for FIGS. 12A-12B. For example, the electro-optic modulator 1102 may use voltages applied to layers of low-dimensional material 64A-B to modulate optical signals within the ring oscillator 1160. The ring oscillator 1160 is optically coupled to a waveguide 60 such that optical signals may be coupled into the ring oscillator 1160 or coupled into the waveguide 60 from the ring oscillator 1160. A photon storage material 1110 may be formed adjacent to (e.g., over) the ring oscillator 1160. The photon storage material 1110 may be similar to the low-dimensional material 1064 described previously for FIGS. 32A-32B, or may be another material such as a material having a nitrogen-vacancy center, or the like. In some embodiments, the electro-optic modulator 1102 may be used to couple photons into or out of the photon storage material 1110, providing memory capability for the photon memory device 1100. This is an example for a photon memory device comprising low-dimensional material(s), and others are possible.

The embodiments herein may achieve some advantages. By utilizing low-dimensional materials in photonic structures (e.g., optical modulators, photodetectors, passive structures, or the like), thinner photonic structures may be manufactured. In some cases, low-dimensional materials may allow for more efficient modulation of an optical signal. Additionally, low-dimensional materials may be formed in various configurations, such as above and/or below waveguides or in stacked arrangements, which can allow for improved design flexibility. In some cases, the use of low-dimensional materials may reduce the manufacturing cost of an optical device. In some cases, low-dimensional materials may be used to tune or control the effective refractive index of a waveguide or similar optical component, which can allow for more efficient operation or reduced component size.

In accordance with some embodiments of the present disclosure, a method includes forming a first waveguide over a substrate; forming a first layer of low-dimensional material on the first waveguide; forming a first layer of dielectric material over the first layer of low-dimensional material; forming a second layer of low dimensional material on the first layer of dielectric material; and forming a first conductive contact that electrically contacts the first layer of low-dimensional material and a second conductive contact that electrically contacts the second layer of low-dimensional material. In an embodiment, the low-dimensional material includes graphene. In an embodiment, the dielectric material includes aluminum oxide. In an embodiment, the first waveguide includes silicon nitride. In an embodiment, the first waveguide is a slot waveguide. In an embodiment, the method includes forming a second waveguide over the second layer of low-dimensional material. In an embodiment, the method includes forming a second layer of dielectric material over the second layer of low-dimensional material and forming a third layer of low-dimensional material over the second layer of dielectric material. In an embodiment, forming the first layer of low-dimensional material includes transferring the layer of low-dimensional material onto the first waveguide and then patterning the layer of low-dimensional material. In an embodiment, the first conductive contact is formed before forming the second layer of low dimensional material.

In accordance with some embodiments of the present disclosure, a method includes forming a first multilayer stack over a substrate, wherein the first multilayer stack includes alternating layers of dielectric material and low-dimensional material; forming a first nitride waveguide over the first multilayer stack; forming a second multilayer stack over the first nitride waveguide, wherein the second multilayer stack includes alternating layers of dielectric material and low-dimensional material; and forming a respective conductive contact on each layer of low-dimensional material of the first multilayer stack and the second multilayer stack. In an embodiment, the method includes depositing an insulating layer on the first multilayer stack, wherein the insulating layer physically contacts the first nitride waveguide. In an embodiment, the method includes forming a second nitride waveguide over the second multilayer stack. In an embodiment, the first multilayer stack includes one dielectric layer sandwiched between two layers of low-dimensional material. In an embodiment, at least one conductive contact is formed before formation of the second multilayer stack. In an embodiment, the first multilayer stack includes at least two laterally separated layers of low-dimensional material. In an embodiment, at least one layer of low-dimensional material of the first multilayer stack physically contacts the first nitride waveguide.

In accordance with some embodiments of the present disclosure, a device includes a waveguide over a substrate; a photonic device over the waveguide, wherein the photonic device includes at least one layer of low-dimensional material that is electrically coupled to a conductive contact and that is optically coupled to the waveguide. In an embodiment, the photonic device is an electro-optic modulator or a photodetector. In an embodiment, the at least one layer of low-dimensional material physically contacts the waveguide. In an embodiment, the low-dimensional material is graphene.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   forming a first waveguide over a substrate;
   forming a first layer of low-dimensional material on the first waveguide;
   forming a first layer of dielectric material over the first layer of low-dimensional material;
   forming a lower portion of a first conductive contact that extends through the first layer of dielectric material to contact the first layer of low-dimensional material;
   forming a second layer of low-dimensional material on the first layer of dielectric material;
   forming a second layer of dielectric material over the second layer of low-dimensional material;
   after forming the second layer of dielectric material, forming an upper portion of the first conductive contact on the lower portion of the first conductive contact; and
   forming a second conductive contact that electrically contacts the second layer of low-dimensional material.

2. The method of claim 1, wherein the low-dimensional material comprises graphene.

3. The method of claim 1, wherein the dielectric material comprises aluminum oxide.

4. The method of claim 1, wherein the first waveguide comprises silicon nitride.

5. The method of claim 1, wherein the first waveguide is a slot waveguide.

6. The method of claim 1 further comprising forming a second waveguide over the second layer of low-dimensional material.

7. The method of claim 1 further comprising:
   forming a third layer of low-dimensional material over the second layer of dielectric material.

8. The method of claim 1, wherein forming the first layer of low-dimensional material comprises transferring a layer of low-dimensional material onto the first waveguide and then patterning the layer of low-dimensional material.

9. The method of claim 1, wherein the upper portion of the first conductive contact and the second conductive contact are formed simultaneously.

10. A method comprising:

forming a first multilayer stack over a substrate, wherein the first multilayer stack comprises alternating layers of dielectric material and low-dimensional material;

forming a first contact portion on a first layer of low-dimensional material of the first multilayer stack;

forming a first nitride waveguide over the first multilayer stack, wherein the first nitride waveguide directly contacts a top surface of a layer of low-dimensional material of the first multilayer stack;

after forming the first nitride waveguide, forming a second contact portion on the first contact portion and forming a third contact portion on a second layer of low-dimensional material of the first multilayer stack; and forming a second multilayer stack over the first nitride waveguide, wherein the second multilayer stack comprises alternating layers of dielectric material and low-dimensional material.

11. The method of claim 10 further comprising depositing an insulating layer on the first multilayer stack, wherein the insulating layer physically contacts the first nitride waveguide.

12. The method of claim 10 further comprising forming a second nitride waveguide over the second multilayer stack, wherein the second nitride waveguide directly contacts a top surface of a layer of low-dimensional material of the second multilayer stack.

13. The method of claim 10, wherein the first multilayer stack comprises one dielectric layer sandwiched between two layers of low-dimensional material.

14. The method of claim 10, wherein at least one conductive contact is formed before formation of the second multilayer stack.

15. The method of claim 10, wherein the first multilayer stack comprises at least two laterally separated layers of low-dimensional material that do not overlap.

16. The method of claim 10, wherein at least one layer of low-dimensional material of the first multilayer stack physically contacts the first nitride waveguide.

17. The method of claim 10 further comprising, after forming the second multilayer stack, forming a fourth contact portion on the second contact portion and forming a fifth contact portion on the third contact portion.

18. A device comprising:

a waveguide over a substrate; and a photonic device on a top surface of the waveguide, wherein the photonic device comprises a layer of low-dimensional material on a top surface of a layer of insulating material, wherein the layer of low-dimensional material is electrically coupled to a conductive contact and is optically coupled to the waveguide, wherein the conductive contact comprises a two-layer stack, wherein a lower layer of the two-layer stack extends on a top surface of the layer of low-dimensional material and on the top surface of the layer of insulating material, wherein a layer of dielectric material extends on the top surface of the layer of low-dimensional material, and wherein an upper layer of the two-layer stack is formed after planarization of the lower layer and the layer of dielectric material.

19. The device of claim 18, wherein the photonic device is an electro-optic modulator or a photodetector.

20. The device of claim 18, wherein the layer of low-dimensional material physically contacts the waveguide.

21. The device of claim 18, wherein the low-dimensional material is graphene.

* * * * *